United States Patent
Aziz et al.

(10) Patent No.: US 12,516,429 B2
(45) Date of Patent: Jan. 6, 2026

(54) CARBON-SUPPORTED NIO ELECTRODE

(71) Applicant: KING FAHD UNIVERSITY OF PETROLEUM AND MINERALS, Dhahran (SA)

(72) Inventors: Md. Abdul Aziz, Dhahran (SA); Mohammed Ameeh Ahmed Qasem, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 232 days.

(21) Appl. No.: 18/473,377

(22) Filed: Sep. 25, 2023

(65) Prior Publication Data
US 2025/0034732 A1    Jan. 30, 2025

Related U.S. Application Data

(62) Division of application No. 15/903,732, filed on Feb. 23, 2018, now Pat. No. 11,795,555.

(51) Int. Cl.
*C25B 11/077* (2021.01)
*B01J 23/755* (2006.01)
(Continued)

(52) U.S. Cl.
CPC .......... *C25B 11/077* (2021.01); *B01J 23/755* (2013.01); *B01J 37/08* (2013.01); *C01G 53/04* (2013.01); *C25B 1/04* (2013.01); *C25B 11/00* (2013.01); *C25B 11/043* (2021.01); *C01P 2002/72* (2013.01); *C01P 2002/82* (2013.01);
(Continued)

(58) Field of Classification Search
CPC ....... C25B 11/077; C25B 11/043; C25B 1/04; C25B 11/00; B01J 23/755; B01J 37/08; C01G 53/04
See application file for complete search history.

(56) References Cited

U.S. PATENT DOCUMENTS

| | | | |
|---|---|---|---|
| 8,759,249 B2 | 6/2014 | Wölk et al. | |
| 2014/0174916 A1* | 6/2014 | Rahman | B01J 37/08 204/290.01 |
| 2016/0017507 A1 | 1/2016 | Dai et al. | |

FOREIGN PATENT DOCUMENTS

| | | |
|---|---|---|
| CN | 101445231 B | 4/2011 |
| CN | 101786171 B | 8/2011 |
| CN | 101624215 B | 7/2012 |

OTHER PUBLICATIONS

Ksenia Fominykh, et al., "Iron-doped nickel oxide nanocrystals as highly efficient electrocatalysts for alkaline water splitting", ACS Nano; vol. 9, No. 5; Apr. 1, 2015; pp. 5180-5188.
(Continued)

*Primary Examiner* — James A Fiorito
(74) *Attorney, Agent, or Firm* — Oblon, McClelland, Maier & Neustadt, L.L.P.

(57) ABSTRACT

A method of making NiO nanoparticles is described, as well as a method of using NiO nanoparticles as an electrocatalyst component to a porous carbon electrode. The carbon electrode may be made of carbonized filter paper. Together, this carbon-supported NiO electrode may be used for water electrolysis. Using a pamoic acid salt in the NiO nanoparticle synthesis leads to smaller and monodisperse nanoparticles, which support higher current densities.

15 Claims, 17 Drawing Sheets

(51) Int. Cl.
  *B01J 37/08* (2006.01)
  *C01G 53/04* (2006.01)
  *C25B 1/04* (2021.01)
  *C25B 11/00* (2021.01)
  *C25B 11/043* (2021.01)

(52) U.S. Cl.
  CPC ...... *C01P 2002/85* (2013.01); *C01P 2002/88* (2013.01); *C01P 2004/03* (2013.01); *C01P 2004/50* (2013.01); *C01P 2004/54* (2013.01); *C01P 2004/64* (2013.01)

(56) References Cited

OTHER PUBLICATIONS

Ksenia Fominykh, et al., "Ultrasmall Dispersible Crystalline Nickel Oxide Nanoparticles as High-Performance Catalysts for Electrochemical Water Splitting", Advanced Functional Materials, vol. 24, Issue 21, Jun. 4, 2014, pp. 3123-3129.

Nail BA, et al., "Nickel oxide particles catalyze photochemical hydrogen evolution from water-nanoscaling promotes p-type character and minority carrier extraction" ACS Nano, vol. 9, No. 5, Apr. 14, 2015, pp. 5135-5142.

Wolfgang Brockner, et al., "Thermal decomposition of nickel nitrate hexahydrate, $NI(NO_3)_2 \cdot 6H_2O$, in comparison to $Co(NO_3)_2 \cdot 6H_2O$ and $Ca(NO_3)_2 \cdot 4H_2O$", Thermochimica Acta, vol. 456, Issue 1, May 1, 2007, pp. 64-68. https://www.sciencedirect.com/science/article/pii/S0040603107000548.

Md. Abdul Aziz, et al., "Preparation of monodispersed carboxylate-functionalized gold nanoparticles using pamoic acid as a reducing and capping reagent", Gold Bull, vol. 47, 2014, pp. 127-132.

Md. Abdul Aziz, et al., "Size-controlled preparation of fluorescent gold nanoparticles using pamoic acid", Gold Bull, vol. 48, 2015, pp. 85-92.

Md. Abdul Aziz, et al., "Hydrothermal synthesis of tin-doped indium oxide nanoparticles using pamoic acid as an organic additive and their photoluminescence properties". J Mater Sci: Mater Electron, vol. 28, 2017, pp. 3226-3233.

Mohammed Ameen Ahmed Qasem, et al., "Influence of Pamoic Acid as a Complexing Agent in the Thermal Preparation of NiO Nanoparticles: Application to Electrochemical Water Oxidation", Chemistry Select, vol. 3, 2018, pp. 573-580.

\* cited by examiner

CARBON-SUPPORTED NIO ELECTRODE

CROSS-REFERENCE TO RELATED APPLICATIONS

The present application is a Division of U.S. application Ser. No. 15/903,732, now allowed, having a filing date of Feb. 23, 2018.

STATEMENT OF ACKNOWLEDGEMENT

This project was prepared with financial support from King Abdulaziz City for Science and Technology (KACST) through the Science & Technology Unit at King Fahd University of Petroleum & Minerals (KFUPM): Project no. 14-ENV332-04, as part of the National Science, Technology and Innovation Plan.

CROSS-REFERENCE TO RELATED PUBLICATION

The document, M. A. A. Qasem, M. A. Aziz, M. Qamaruddin, J.-P. Kim, S. A. Onaizi, "Influence of Pamoic Acid as a Complexing Agent in the Thermal Preparation of NiO Nanoparticles: Application to Electrochemical Water Oxidation," ChemistrySelect 3, 573-580 (2018), doi: 10.1002/slct.201702340, is herein incorporated by reference in its entirety.

BACKGROUND OF THE INVENTION

Technical Field

The present invention relates to a method of making NiO nanoparticles, and a method of using NiO nanoparticles as part of a carbon-supported electrode for water electrolysis.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Over the past two decades, bulk and nanoscale nickel oxide (NiO) have attracted attention for high stability and low toxicity, along with anomalous chemical, electrochemical, electronic, magnetic, and catalytic properties. See A. Rani, International Journal of Analytical Chemistry 2016, Article ID 3512145, (2016); R. Azhagu Raj, M. S. AlSalhi, S. Devanesanm, Materials 10, 460 (2017), doi: 10.3390/ma10050460; B. Kavitha, M. Nirmala, A. Pavithra, World Scientific News 52 118-129 (2016); Y. Chen, Y. Sun, X. Dai, B. Zhang, Z. Ye, M. W, H. Wu, Thin Solid Films 592, 195-199 (2015); S. Sriram, A. Thayumanavan, International Journal of Materials Science and Engineering 1, 118-121 (2013); J. A. Tanna, R. G. Chaudhary, N. V Gandhare, A. R. Rai, Harjeet D. Juneja, International Journal of Scientific & Engineering Research 6, 93-99 (2015); D. Sun, B. Zhao, J. Liu, H. W. H. Yan, Ionics 23, 1509-1515 (2017); F. Motahari, M. R. Mozdianfard, F. Soofivand, M. Salavati-Niasari, RSC Adv., 4, 27654-27660 (2014); A. K. Rai, L. T. Anh, C. Park, J. Kim, Ceramics International 39, 6611-6618 (2013); M. Tadic, D. Nikolic, M. Panjan, G. R. Blake, Journal of Alloys and Compounds 647, 1061-1068 (2015); M. Albalawi, MS thesis entitled "Effect of surfactant on structural and electrochemical properties of nickel oxide" Pittsburg State University, Pittsburg, Kansas (2016); M. El-Kemary, N. Nagy, I. El-Mehasseb, Materials Science in Semiconductor Processing 16, 1747-1752 (2013); L. A. Saghatforoush, M. Hasanzadeh, S. Sanati, R. Mehdizadeh, Bull. Korean Chem. Soc. 33 (2012) 2613-2618; G. Zeng, W. Li, S. Ci, J. Jia, Z. Wen, Scientific Reports 6:36454, DOI: 10.1038/srep36454; O. E. Fayemi, A. S. Adekunle, E. E. Ebenso, Sensing and Bio-Sensing Research 13, 17-27 (2017); S. R. K. Kumar, K. Y. Kumar, G. P. Mamatha, H. B. Muralidhara, M. S. Anantha, S. Archana, T. N. V. Raj, Journal of Chemical and Pharmaceutical Research 8, 633-639 (2016); M. Tyagi, M. Tomar, V. Gupta, Biosensors and Bioelectronics 41, 110-115 (2013); D. V. Ahire, G. E. Patil, G. H. Jain, V. B. Gaikwad, Sixth International Conference on Sensing Technology 136-141 (2012); Y. Zhang, L. Xie, C. Yuan, C. Zhang, S. Liu, Y. Peng, H. Li, M. Zhang, J Mater Sci: Mater Electron 27, 1817-1827 (2016); U. Kwon, B. Kim, D. C. Nguyen, J. Park, N. Y. Ha, S. Kim, S. H. Ko, S. Lee, D. Lee, H. J. Park, Scientific Reports, 6:30759 (2016) DOI: 10.1038/srep30759; G. Yang, W. Zhou, M. Liu, Z. Shao, ACS Appl. Mater. Interfaces 8, 35308-35314 (2016); A. Singh, M. Fekete, T. Gengenbach, A. N. Simonov, R. K. Hocking, S. L. Y. Chang, M. Rothmann, S. Powar, D. Fu, Z. Hu, Q. Wu, Y. Cheng, U. Bach, L. Spiccia, ChemSusChem 8, 4266-4274 (2015); D. Wang, F. Watanabe, W. Zhao, ECS Journal of Solid State Science and Technology, 6, M3049-M3054 (2017); M. Khairy, S. A. El-Safty, M. Ismael, H. Kawarada, Applied Catalysis B: Environmental 127, 1-10 (2012), each incorporated herein by reference in their entirety.

NiO nanoparticles (NiONPs), in particular, are used in a variety of fields as optochemical sensors, electrochemical sensors, biosensors, electrochromic windows, gas sensors, batteries, fuel cells, electrochemical water splitting, catalysis, and photocatalysts. See R. Azhagu Raj et al.; J. A. Tanna et al.; D. Sun et al.; F. Motahari et al.; A. K. Rai et al.; M. El-Kemary et al.; L. A. Saghatforoush et al.; G. Zeng et al.; O. E. Fayemi et al.; S. R. K. Kumar et al.; M. Tyagi et al.; D. V. Ahire et al.; Y. Zhang et al.; U. Kwon et al.; G. Yang et al.; A. Singh et al.; D. Wang et al.; and M. Khairy et al., each incorporated herein by reference in their entirety.

The broad applicability of nanoscale NiO relies on the material's high surface area and interesting properties, including chemical, electrochemical, and catalytic properties, which are not present in the bulk material. To meet the high demand for this nanoscale material, several synthetic methods have been developed based on hydrothermal, sol-gel, hot-injection, co-precipitation, microwave, reverse micelle templated, electrochemical, pulsed laser ablation and thermal decomposition techniques, as well as techniques based on complex formation with an organic moieties and successively their thermal decomposition. See A. Rani; R. Azhagu Raj et al.; B. Kavitha et al.; J. A. Tanna et al.; D. Sun et al.; F. Motahari et al.; A. K. Rai et al.; M. Tadic et al.; M. Albalawi; M. El-Kemary et al.; G. Zeng et al.; S. R. K. Kumar et al.; M. Tyagi et al.; D. V. Ahire et al.; Y. Zhang et al.; M. Khairy et al.; X. Zhang et al., W. Shi, J. Zhu, W. Zhao, J. Ma, S. Mhaisalkar, T. L. Maria, Y. Yang, H. Zhang, H. H. Hng, Q. Yan, Nano Res. 3, 643-652 (2010); X. Wang, L. Li, Y. Zhang, S. Wang, Z. Zhang, L. Fei, Y. Qian, Crystal Growth & Design 6, 2163-2165 (2006); D. Wang, R. Xu, X. Wang, Y. Li, Nanotechnology 17, 979-983 (2006); Z. Fereshteh, M. Salavati-Niasari, K. Saberyan, S. M. Hosseinpour-Mashkani, F. Tavakoli, J Clust Sci 23, 577-583 (2012); A. Barakat, M. Al-Noaimi, M. Suleiman, A. S. Aldwayyan, B. Hammouti, T. Ben Hadda, S. F. Haddad, A. Boshaala, I.

Warad, Int. J. Mol. Sci. 14, 23941-23954 (2013); S. Rakshit, S. Chall, S. S. Mati, A. Roychowdhury, S. P. Moulik, Subhash Chandra Bhattacharya, RSC Adv. 3, 6106-6116 (2013); A. D. Khalaji, M. Nikookar, D. Das, Res Chem Intermed 41, 357-363 (2015); N. Dharmaraj, P. Prabu, S. Nagarajan, C. H. Kim, J. H. Park, H. Y. Kim. Materials Science and Engineering B 128, 111-114 (2006); S. Vaidya, P. Rastogi, S. Agarwal, S. K. Gupta, T. Ahmad, A. M. Antonelli, Jr., K. V. Ramanujachary, S. E. Lofland, A. K. Ganguli, J. Phys. Chem. C 112. 12610-12615 (2008); and M. A. Gondal, T. A. Saleh, Q. A. Drmosh, Applied Surface Science 258, 6982-6986 (2012), each incorporated herein by reference in their entirety.

Nanoscale NiO particles have been prepared to have a variety of sizes and shapes, including nanospheres (NPs), nanoplates, nanosheets, nanorings, nanoflowers, nanorods, and nanocubes. See R. Azhagu Raj et al.; B. Kavitha et al.; J. A. Tanna et al; D. Sun et al.; F. Motahari et al.; A. K. Rai et al.; M. Tadic et al.; M. Albalawi; M. El-Kemary et al.; G. Zeng et al.; S. R. K. Kumar et al.; M. Tyagi et al.; D. V. Ahire et al.; Y. Zhang et al.; M. Khairy et al.; X. Zhang et al et al.; X. Wang et al.; D. Wang, R. Xu, X. Wang, Y. Li, Nanotechnology 17, 979-983 (2006); Z. Fereshteh et al.; A. Barakat et al.; S. Rakshit et al.; A. D. Khalaji et al.; N. Dharmaraj et al.; S. Vaidya et al.; and M. A. Gondal et al., each incorporated herein by reference in their entirety.

Numerous studies have examined the preparation of nanoscale NiO. However, the development of novel synthetic methods that are simple and provide smaller or more monodisperse product profiles remains a topic of interest. Small monodisperse NPs are valuable because they provide a high surface area and homogeneous properties compared to larger polydisperse NPs samples.

Structure 1

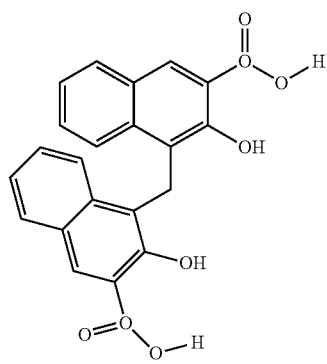

Organic moieties that act as a surfactant, stabilizer, reductant, or ligand play an important role in determining the sizes and shapes of NPs. In previous experiments, monodisperse 10.8 nm florescent gold NPs were prepared using pamoic acid (PA) (Structure 1) as a reductant and stabilizer. See M. A. Aziz, J. Kim, M. Oyama, Gold Bull 47, 127-132 (2014); and M. A. Aziz, J. Kim, M. N. Shaikh, M. Oyama, F. O. Bakare, Z. H. Yamani, Gold Bull 48, 85-92 (2015), each incorporated herein by reference in their entirety. Disodium salt pamoic acid ($Na_2PA$) provided monodisperse tin-doped indium oxide (ITO) NPs by acting as an organic additive and dehydrating agent. See M. A. Aziz, M. H. Zahir, M. N. Shaikh, A. Al-Betar, M. Oyama, K. O. Sulaiman, J Mater Sci; Mater Electron 28, 3226-3233 (2017), incorporated herein by reference in its entirety. PA includes two 3-hydroxy-2-naphthoic acid units bridged at the 1-position by a methylene (—$CH_2$—) group, as shown in Structure 1. PA has been used for salt formation in pharmaceutical formulations, and PA and its monomer, 3-hydroxy-2-naphthoic acid, act as ligands in transition metal complexes; however, no studies have described the use of PA or its disodium salt as a complexing agent for the thermal preparation of monodisperse NiONPs. See 38. M. Jorgensen, Journal of Chromatography B 716, 315-323 (1998); G. S. Baghel, C. P. Rao, Polyhedron 28, 3507-3514 (2009); Na Li, L. Gou, H. Hu, S. Chen, X. Chen, B. Wang, Q. Wu, M. Yang, G. Xue, Inorganica Chimica Acta 362, 3475-3483 (2009); M. Chandra, A. K. Dey, Transition Met. Chem. 5, 1-3 (1980); X. Shi, M. Li, X. He, H. Liu, M. Shao, Polyhedron 29, 2075-2080 (2010); H. Oda, T. Kitao, Dyes and Pigments 16, 1-10 (1991); S. Wang, R. Yun, Y. Peng, Q. Zhang, J. Lu, J. Dou, J. Bai, D. Li, D. Wang, Cryst. Growth Des. 12, 79-92 2012; and N. Arunadevi, S. Vairam, E-Journal of Chemistry, 6, S413-S421 (2009), each incorporated herein by reference in their entirety. $Na_2PA$ may be used as an electrocatalyst for water splitting. Electrochemical water splitting is important in renewable energy applications that convert solar energy into a usable fuel.

An electrocatalyst's cost, quality, and performance during water electrooxidation depend significantly on the substrate electrode. Glassy carbon electrodes (GCEs) are widely used to test electrocatalysts in a variety of electrochemical applications; however, they have a low surface area compared to porous electrodes, which limits the extent to which their surface modification may produce an efficient nanoelectrocatalyst. Moreover, the high cost of GCEs limits their applicability to the energy sector. Use of interconnected micro-nanostructured carbon is advantageous in that electrocatalysts are readily captured by the micro-nanostructured pores or adsorbed onto the side walls of the pores. Pyrolyzed filter paper may be used as a cheap source of carbon to provide highly conductive, low-cost, interconnected, micro-nanostructured carbon electrodes for a variety of electrochemical applications. See L. Jiang, G. W. Nelson, H. Kim, I. N. Sim, S. O. Han, J. S. Foord, ChemistryOpen 4, 586-589 (2015); and M. Liu, S. He, W. Fan, Y. Miao, T. Liu, Composites Science and Technology 101, 152-158 (2014), each incorporated herein by reference in their entirety.

In view of the foregoing, one objective of the present invention is to provide a method of making NiO nanoparticles. The NiO nanoparticles may be deposited on a carbonized paper electrode and used in an electrochemical cell for water electrolysis.

BRIEF SUMMARY OF THE INVENTION

According to a first aspect, the present disclosure relates to a method for making NiO nanoparticles that have an average particle size of 5-50 nm. The method involves the steps of mixing a nickel salt, pamoic acid or a pamoic acid salt, and an alcohol to form a dispersed mixture; drying the dispersed mixture to produce a dried mass; and heating the dried mass in air at a temperature of 420-700° C. for 1-6 h to produce the NiO nanoparticles.

In one embodiment, the nickel salt and the pamoic acid or the pamoic acid salt have a combined weight percentage of 0.8-2.5 wt % relative to a total weight of the dispersed mixture.

In one embodiment, the NiO nanoparticles are monodisperse and have an aspect ratio of 1:1-1.5:1.

In one embodiment, the NiO nanoparticles have a crystalline bunsenite morphology.

In one embodiment, at least 70% of the NiO nanoparticles have a particle size of 10-40 nm.

In one embodiment, a molar ratio of the pamoic acid or the pamoic acid salt to the nickel salt is 5:10-8:10.

In one embodiment, the nickel salt is $Ni(NO_3)_2$ or $Ni(NO_3)_2 \cdot 6H_2O$.

In one embodiment, the pamoic acid salt is present, and the pamoic acid salt is disodium pamoate.

In one embodiment, the NiO nanoparticles have an average particle size that is substantially smaller than an average particle size of NiO nanoparticles produced by an otherwise identical method having no pamoic acid and no pamoic acid salt.

According to a second aspect, the present disclosure relates to a carbon-supported NiO electrode, comprising carbonized paper and NiO nanoparticles having an average particle size of 5-50 nm, deposited on the carbonized paper. Additionally, the carbon-supported NiO electrode is substantially free of $Ni^0$.

In one embodiment, a density of the NiO nanoparticles on the carbonized paper is 100-200 μg/cm².

In one embodiment, the NiO nanoparticles are aggregated into clusters having diameters of 1-15 μm.

In one embodiment, the clusters have a nearest neighbor distance of 500 nm-5 μm.

In one embodiment, the NiO nanoparticles are made by a method involving the steps of mixing a nickel salt, pamoic acid or a pamoic acid salt, and an alcohol to form a dispersed mixture; drying the dispersed mixture to produce a dried mass; and heating the dried mass in air at a temperature of 420-700° C. for 1-6 h to produce the NiO nanoparticles.

According to a third aspect, the present disclosure relates to an electrochemical cell, comprising the carbon-supported NiO electrode of the second aspect, a counter electrode, and an electrolyte solution in contact with both electrodes.

In one embodiment, the electrolyte solution comprises water and an inorganic base at a concentration of 0.05-0.4 M.

In one embodiment, the carbon-supported NiO electrode has a current density of 26-35 mA/cm² when the electrodes are subjected to a potential of 1.3-1.8 V.

In one embodiment, the electrochemical cell of claim further comprises a reference electrode in contact with the electrolyte solution.

According to a fourth embodiment, the present disclosure relates to a method for decomposing water into $H_2$ and $O_2$. This method involves the step of subjecting the electrodes of the electrochemical cell of the third aspect with a potential of 0.5-2.0 V.

In one embodiment, the method further comprises the step of separately collecting $H_2$-enriched gas and $O_2$-enriched gas.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
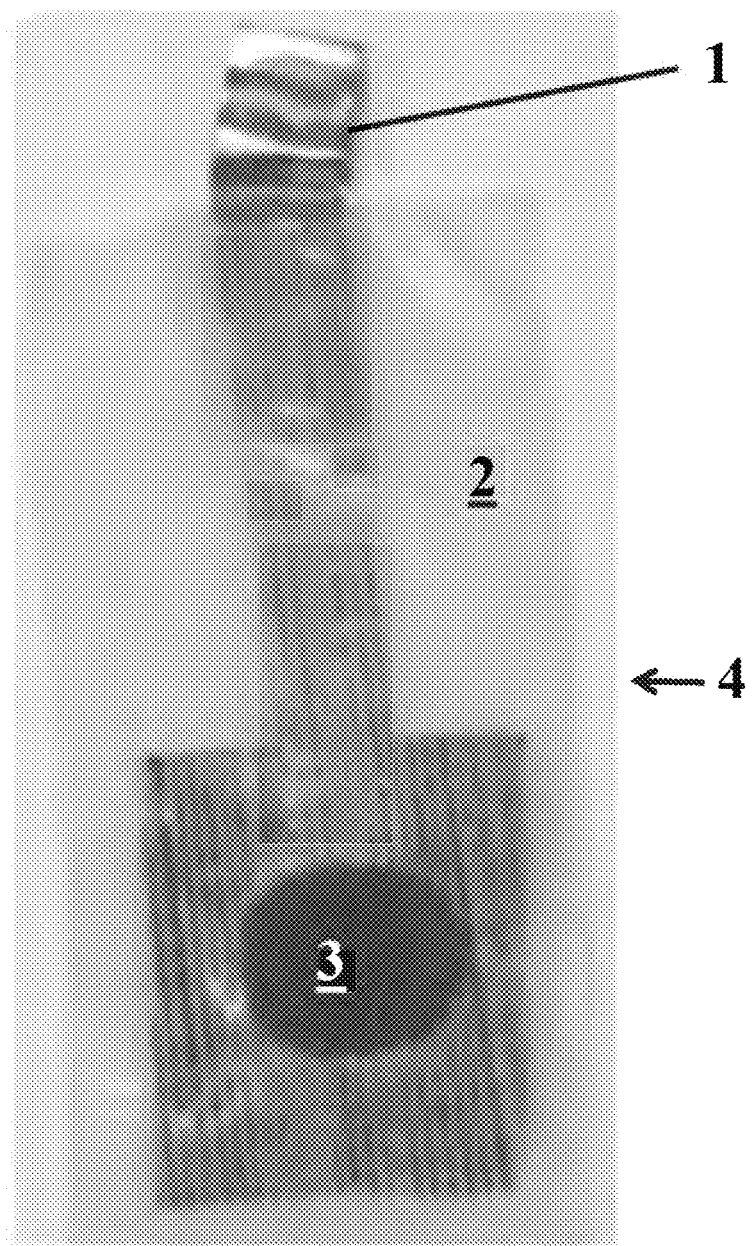
FIG. 1 is an electrode assembly comprising a filter paper derived carbon electrode (FPCE).

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of nickel include $^{58}Ni$, $^{60}Ni$, $^{61}Ni$, $^{62}Ni$, and $^{64}Ni$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, "particle size" and "pore size" may be thought of as the diameters or longest dimensions of a particle and of a pore opening, respectively.

For polygonal shapes, the term "diameter," as used herein, and unless otherwise specified, refers to the greatest possible distance measured from a vertex of a polygon through the center of the face to the vertex on the opposite side. For a circle, an oval, and an ellipse, "diameter" refers to the greatest possible distance measured from one point on the shape through the center of the shape to a point directly across from it.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a method for making NiO nanoparticles that have an average particle size of 5-50 nm. The method involves the steps of mixing a nickel salt, pamoic acid or a pamoic acid salt, and an alcohol to form a dispersed mixture; drying the dispersed mixture to produce a dried mass; and heating the dried mass in to produce the NiO nanoparticles.

Nanoparticles are particles between 1 and 100 nm ($10^2$ to $10^7$ atoms) in size. A particle is defined as a small object that behaves as a whole unit with respect to its transport and properties. The exceptionally high surface area to volume ratio of nanoparticles may cause the nanoparticles to exhibit significantly different or even novel properties from those observed in individual atoms/molecules, fine particles and/or bulk materials. Nanoparticles may be classified according to their dimensions. Three-dimensional nanoparticles preferably have all dimensions of less than 100 nm, and generally encompass isodimensional nanoparticles. Examples of three dimensional nanoparticles include, but are not limited to nanoparticles, nanospheres, nanogranules and nanobeads. Two-dimensional nanoparticles have two dimensions of less than 100 nm, generally including diameter. Examples of two-dimensional nanoparticles include, but are not limited to, nanosheets, nanoplatelets, nanolaminas and nanoshells. One-dimensional nanoparticles have one dimension of less than 100 nm, generally thickness. Examples of one-dimensional nanoparticles include, but are not limited to, nanotubes, nanofibers and nanowhiskers. The NiO nanoparticles of the present disclosure preferably are three-dimensional nanoparticles but may be one-dimensional, two-dimensional, three-dimensional or mixtures thereof. In an alternative embodiment, NiO particles, having one or more dimensions greater than 100 nm, may be used in in the present disclosure.

In one embodiment, the NiO nanoparticles of the present disclosure are cubic, rectangular, prismatic, octahedral, or hexagonal. In one embodiment, the NiO nanoparticles may have a combination of planar sides with rounded edges or corners. In another embodiment, the NiO nanoparticles may be considered more rounded and spherical than cubic and prismatic. In an alternative embodiment, the NiO nanoparticles may be considered to be nanoparticles and nanostructures of different morphologies and shapes than those previously listed. For instance, and without limitation, the NiO may be made in the form of nanowires, nanocrystals, nanorectangles, nanotriangles, nanopentagons, nanohexagons, nanoprisms, nanodisks, nanocubes, nanoribbons, nanorods, nanobeads, nanotoroids, nanodiscs, nanogranules, nanowhiskers, nanoflakes, nanofoils, nanopowders, nanoboxes, nanostars, tetrapods, nanobelts, nano-urchins, nanofloweres, etc. and mixtures thereof. The above-mentioned morphologies sometimes arise spontaneously as an effect of the synthesis or from the innate crystallographic growth patterns of the materials themselves. Some of these morphologies may serve a purpose, such as bridging an electrical junction or providing a high surface area for electrocatalysis in a solution. In one embodiment, the NiO nanoparticles have a crystalline bunsenite morphology. Having a crystalline bunsenite morphology means that the NiO nanoparticles comprise at least 90 wt %, preferably at least 95 wt %, more preferably at least 99 wt % crystalline NiO relative to a total weight of the NiO, and this crystalline NiO has a bunsenite morphology. This means that the crystalline NiO has an isometric or cubic crystal system. The crystalline NiO may have a structure within the Fm3m space group, and the structure may be part of the hexoctahedral crystal class. "Bunsenite" is also the name for naturally occurring crystalline NiO. In one embodiment, where the NiO nanoparticles comprise less than 100 wt % crystalline NiO in a bunsenite morphology relative to a total weight of the NiO, the NiO that is not crystalline NiO in a bunsenite morphology may be amorphous NiO, or NiO having a different crystal morphology. Preferably the NiO nanoparticles comprise at least 95 wt % NiO, preferably at least 99 wt % NiO, more preferably at least 99.5 wt % NiO, even more preferably at least 99.9 wt % NiO, or about 100 wt % NiO, relative to a total weight of the nanoparticles. In one embodiment, the NiO nanoparticles may comprise less than 100 wt % NiO, and may further comprise $Ni^o$, $Ni_2O_3$ (nickel (III) oxide), or other metals or compounds. In one embodiment, the NiO nanoparticles may be intentionally doped with metals such as $Ni^o$, Fe, Zn, or some other metal. In this embodiment, the doped NiO nanoparticles may comprise 0.1-60 wt %, preferably 5-50 wt %, more preferably 10-30 wt % one or more other metals relative to a total weight of the doped NiO nanoparticles.

In one embodiment, the NiO nanoparticles have an average particle size of 5-50 nm, preferably 8-40 nm, more preferably 12-30 nm, even more preferably 15-25 nm. However, in some embodiments, the NiO nanoparticles may have an average particle size of less than 5 nm or greater than 50 nm. In another embodiment, the NiO nanoparticles may have particle sizes ranging from 20-400 nm, preferably 25-200 nm, more preferably 30-100 nm, even more preferably 35-50 nm.

In one embodiment, the NiO nanoparticles are monodisperse. Dispersity is a measure of the heterogeneity of sizes of molecules or particles in a mixture. In probability theory and statistics, the coefficient of variation (CV), also known as relative standard deviation (RSD) is a standardized measure of dispersion of a probability distribution. It is expressed as a percentage and is defined as the ratio of the standard deviation ($\sigma$) of to the mean ($\mu$, or its absolute value, $|\mu|$). The CV or RSD is widely used to express precision and repeatability. It shows the extent of variability in relation to the mean of a population. As used herein, "monodisperse", "monodispersed" and/or "monodispersity" refers to nanoparticles having a CV or RSD of less than 20%, preferably less than 15%, more preferably less than 10%. However in some embodiments, the NiO nanoparticles may have a CV or RSD of 20% or greater.

In one embodiment, at least 70% of the NiO nanoparticles have a particle size of 10-40 nm, preferably 10-30 nm. In another embodiment, at least 80%, preferably at least 85% of the NiO nanoparticles have a particle size of 10-40 nm, preferably 10-30 nm, more preferably 12-27 nm. However, in some embodiments, less than 70% of the NiO nanoparticles have a particle size of 10-40 nm. For instance, 40-45%, 45-50%, 50-55%, 55-60%, 60-65%, or 65-69% of the NiO nanoparticles may have a particle size of 10-40 nm. In another embodiment, 5-30%, preferably 6-10% of the NiO nanoparticles may have a particle size of less than 10 nm. In another embodiment, 5-40%, preferably 6-30%, more preferably 7-20%, even more preferably 7-12% of the NiO nanoparticles may have a particle size of greater than 40 nm. In another embodiment, the NiO nanoparticles may have particle sizes ranging from 20-400 nm, preferably 25-200 nm, more preferably 30-100 nm, even more preferably 35-50 nm. The above particle size ranges and distributions may be determined by TEM, SEM, dynamic light scattering (DLS), a particle size analyzer, or some other method or instrument.

In one embodiment, the NiO nanoparticles have an aspect ratio of 1:1-1.5:1, preferably 1.05:1-1.40:1, more preferably 1.1:1-1.35:1. However, in some embodiments, the aspect ratio may be greater than 1.5:1. As described here, the aspect ratio is the ratio of a nanoparticle's length to its width. For example and without limitation, a perfect sphere and a perfect cube have an aspect ratio of 1:1. A rectangular prism that is not a cube would have an aspect ratio larger than 1:1.

The NiO nanoparticles may have a band gap energy of 2.45-3.80 eV, preferably 2.60-3.70 eV, more preferably 3.20-3.60 eV, though in some embodiments, the band gap energy may be less than 2.45 eV or greater than 3.80 eV.

The method of making the NiO nanoparticles involves mixing a nickel salt, pamoic acid or a pamoic acid salt, and an alcohol to form a dispersed mixture. The alcohol may be ethanol, methanol, 1-propanol, 2-propanol, or some other alcohol. Preferably the alcohol is ethanol. In alternative embodiments, other solvents, such as acetone or water, may be used to form the dispersed mixture. The mixing may occur by stirring, shaking, sonicating, blending, or by otherwise agitating the mixture. Preferably the mixture is sonicated for 5-60 min, preferably 10-30 min. In one embodiment, one compound (the nickel salt or the pamoic acid/pamoic acid salt) may be dispersed or mixed in the alcohol first, and then the other compound may be added and dispersed. In one embodiment, the nickel salt is mixed with the alcohol first by sonication, and then the pamoic acid or the pamoic acid salt is added and mixed by sonication.

In one embodiment, a molar ratio of the pamoic acid or the pamoic acid salt to the nickel salt is 5:10-8:10, preferably 5.5:10-7.5:10, more preferably 5.8:10-7.0:10, or about 5.9: 10. However, in some embodiments, the molar ratio of the pamoic acid salt to the nickel salt is less than 5:10 or greater than 8:10.

In one embodiment, the nickel salt and the pamoic acid or pamoic acid salt have a combined weight percentage of 0.8-2.5 wt %, preferably 1.0-2.2 wt %, more preferably 1.2-2.0 wt % relative to a total weight of the dispersed mixture. However, in some embodiments, the nickel salt and the pamoic acid or pamoic acid salt may have a combined weight percentage of less than 0.8 wt % or greater than 2.5 wt %, relative to a total weight of the dispersed mixture. In one embodiment, this combined weight percentage may be easily adjusted by using more or less alcohol or other solvent in the dispersed mixture.

In one embodiment, the nickel salt is $Ni(NO_3)_2$, $NiCl_2$, $NiBr_2$, $NiI_2$, $NiSO_4$, nickel acetate, or some other nickel salt. Preferably the nickel has a +2 oxidation state, though in an alternative embodiment, nickel having a different oxidation state, such as +3, may be used. Preferably, the nickel salt may be in any hydration state, for instance, $Ni(NO_3)_2$ includes both $Ni(NO_3)_2$ and $Ni(NO_3)_2 \cdot 6H_2O$. In a preferred embodiment, the nickel salt is $Ni(NO_3)_2$.

In alternative embodiments, metal salts may be used other than Ni to produce metal oxide nanoparticles other than NiO. For example, and without limitation, these metal salts may be $Cu(NO_3)_2$, $CuCl_2$, $CuSO_4$, $CdCl_2$, $Co(NO_3)_2$, $Mn(NO_3)_2$, $Zr(NO_3)_2$, or $Zn(NO_3)_2$. Additional metal salts, comprising Ni or some other metal, may be used in the method. For example, such conventional salts include those derived from inorganic acids such as hydrochloric, hydrobromic, sulfuric, sulfamic, phosphoric, and nitric; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like.

Pamoic acid (PA, $C_{23}H_{16}O_6$), also called embonic acid or 4,4'-methylene-bis(3-hydroxy-2-naphthalene carboxylic acid), is a naphthoic acid derivative. The chemical structure of pamoic acid is shown in Structure 1.

Structure 1

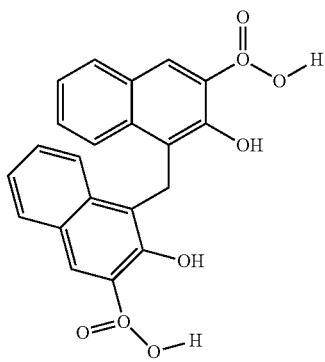

Pamoic acid has two 2-naphthol units, which are bridged at position 1 of 2-naphthol by a methylene group, and each naphthol unit contains one carboxylic acid group at position 3. Salts and esters of pamoic acid are known as pamoates or embonates. In pharmacology, the salt form of pamoic acid (pamoate ion) may be used as a counter ion of a drug compound to increase the solubility of the drug in water. The presence of multiple oxygen atoms enables significant hydrogen bonding to occur, facilitating the dissolution of compounds in water. Pamoic acid is also frequently used as a ligand for making dinuclear Ti(IV) complexes. Pamoic acid is insoluble in water, but its sodium salt may be dissolved.

In the methods of the disclosure, pamoic acid or a pamoic acid salt may be used to form the dispersed mixture. In one embodiment, more than one pamoic acid salt may be used. In another embodiment, both pamoic acid and one or more pamoic acid salts may be added. The dispersed mixture may comprise pamoic acid, pamoate ion, and/or a pamoic acid salt based on solubility, temperature, and pH. In general, "pamoic acid salt" may be thought to include, pamoic acid salts, pamoic acid, pamoate ion, and combinations thereof.

The molecular structure of pamoic acid features two carboxylate groups in a single molecule. In one embodiment these carboxylate groups bind to $Ni^{2+}$ and may be considered bidentate.

In one embodiment, the carboxylate groups of pamoic acid may be protonated, covalently modified and/or form a salt. Exemplary covalent modifications may include typical carboxylic acid modifications and/or isoesters including, but not limited to, esters, amines, hydroxamic acids and/or acylsulfonamides. The salt counter ions or cations are not viewed as particularly limiting and will reflect the base used in forming the pamoates which may include, but are not limited to, sodium, lithium, potassium, cesium, rubidium, ammonium, magnesium, calcium, beryllium, strontium, and mixtures thereof. In a preferred embodiment, the pamoic acid salt is disodium pamoate (abbreviated as $Na_2PA$).

In one embodiment, the free hydroxyl groups of the pamoic acid framework may be modified in manners typical of hydroxyl groups, i.e. alkyl and/or silyl ethers. In another embodiment, several common chemical modifications to the naphthalene ring system of pamoic acid are envisaged including, but not limited to, electrophilic aromatic substitution (i.e. chlorine) or alkylation (i.e., Friedel-Crafts reactions, alkene alkylation, alcohol alkylation), and these and other pamoic acid derivatives may be used in the present invention. As used herein, "pamoic acid derivatives" may be thought to include the basic dimeric naphthalene framework, and the naphthyl groups may be modified alpha or beta with a group $R_1$-$R_8$ which may include, but is not limited to, $C_1$-$C_{10}$ alkyl chains, halogen groups, alkoxyl groups, and the like.

In one embodiment, the method may be adapted to incorporate other naphthoic acid salt derivatives in addition to, or in place of, the pamoic acid salt. Examples of such naphthoic acid salt derivatives include, but are not limited to, salts of 3-hydroxy-2-naphthalene carboxylic acid, 2-hydroxy-1-naphthalene, 2-naphthol, 2-naphthoic acid, 6-amino-2-naphthoic acid, and 1-naphthoic acid. In an alternative embodiment, the method may be adapted to incorporate other metal ion chelators, or other compounds that coordinate with metal ions. These compounds may include, but are not limited to, EDTA, EGTA, DOTA, BAPTA, citric acid, and salts thereof.

The method also involves the step of drying the dispersed mixture to produce a dried mass. Preferably this step involves the removal of the alcohol and other solvents from the dispersed mixture, and coordinated solvents may also be removed. In one embodiment, this step involves heating the dispersed mixture to evaporate the alcohol. For instance, the dispersed mixture may be heated at 50-70° C. while stirring in order to remove the alcohol. In other embodiments, the dispersed mixture may be subjected to a vacuum, or a rotary evaporator. In another embodiment, the dispersed mixture may be heated in an oven, or left at room temperature.

The dried mass may then be heated in air within a furnace or oven at a temperature of 420-700° C., preferably 450-650° C., more preferably 500-550° C., though in some embodiments, the dried mass may be heated at a temperature of lower than 420° C. or higher than 700° C. Also, in some embodiments, the dried mass may not be heated in air, but oxygen-enriched air, an inert gas, or a vacuum. Preferably the dried mass is placed in an oven at room temperature or 20-50° C., and then the temperature is increased to the target heating temperature at a rate of 5-15° C./min, preferably 8-12° C./min. The dried mass may be maintained at a peak temperature for 1-6 h, preferably 2-5 h, or about 3 h. Heating the dried mass produces the NiO nanoparticles, which may be cooled at a rate of 3-12° C./min or about 5° C./min until reaching room temperature.

In one embodiment, the drying of the dispersed mixture and the heating of the dried mass may be combined into a single step of heating the dispersed mixture.

In one embodiment, the NiO nanoparticles have an average particle size that is substantially smaller than an average particle size of NiO nanoparticles produced by an otherwise identical method having no pamoic acid and no pamoic acid salt. For example, FIGS. 5C and 5D show SEM images of NiO nanoparticles prepared by an otherwise identical method that does not use a pamoic acid salt, and these nanoparticles have particle sizes of 23-284 nm. In one embodiment, the NiO nanoparticles may have an average particle size that is 5-110%, preferably 10-80%, more preferably 20-70% of the average particle size of the NiO nanoparticles prepared by an otherwise identical method that does not use pamoic acid or a pamoic acid salt.

According to a second aspect, the present disclosure relates to a carbon-supported NiO electrode, comprising carbonized paper and NiO nanoparticles deposited on the carbonized paper. In one embodiment, the carbon-supported NiO electrode may be considered an electrocatalyst, though in another embodiment, just the NiO nanoparticles of the carbon-supported NiO electrode may be considered the electrocatalyst.

In one embodiment, the NiO nanoparticles of the carbon-supported NiO electrode are made by the method of the first aspect of the disclosure. Thus, the NiO nanoparticles may have sizes, dimensions, and properties as those previously mentioned. Alternatively, the NiO nanoparticles may be made by a sol-gel process or some other process. In another alternative embodiment, NiO nanoparticles may be derived from naturally-occurring bunsenite. In one embodiment, NiO nanoparticles may be formed or deposited on the carbonized paper by electrodeposition or thermal evaporation. In one embodiment, the NiO nanoparticles of the carbon-supported NiO electrode may have one or more properties or characteristics different than NiO nanoparticles made by the method of the first aspect of the disclosure.

Additionally, the carbon-supported NiO electrode is substantially free of $Ni^0$. As defined here, the carbon-supported NiO electrode being "substantially free of $Ni^0$" means that the carbon-supported NiO electrode comprises less than 2 wt % $Ni^0$, preferably less than 0.5 wt % $Ni^0$, more preferably less than 0.1 wt % $Ni^0$, relative to a total weight of the NiO. In an alternative embodiment, however, the carbon-supported NiO electrode may comprise $Ni^0$, for instance, at a weight percentage of 20-80 wt %, more preferably 30-50 wt %, relative to a total weight of the combined NiO and $Ni^0$.

In one embodiment, a density of the NiO nanoparticles on the carbonized paper is 100-200 μg/cm$^2$, preferably 110-190 μg/cm$^2$, more preferably 130-170 μg/cm$^2$, or about 150 μg/cm$^2$. However, in some embodiments, the density of the NiO nanoparticles may be less than 100 μg/cm$^2$ or greater than 200 g/cm$^2$.

In one embodiment, the NiO nanoparticles are aggregated into clusters having diameters of 1-15 μm, preferably 2-14 μm, more preferably 3-12 μm. However, in other embodiments, the NiO nanoparticles may be aggregated into clusters having diameters of less than 1 μm or greater than 15 μm.

In one embodiment, the clusters have a nearest neighbor distance of 500 nm-5 μm, preferably 750 nm-4 μm, more preferably 1 μm-3 μm. However, in other embodiments, the NiO nanoparticles may have a nearest neighbor distance of less than 500 nm or greater than 5 μm.

Carbonized paper may be referred to as pyrolyzed paper, and may be made by subjecting paper, such as paper tissue, filter paper, printer paper, notebook paper, cardstock, cardboard, or some other paper or paper fiber product to pyrolysis. Pyrolysis is a thermal decomposition of materials at elevated temperatures (such as temperatures of 300° C. or greater, preferably 400° C. or greater, more preferably 500° C. or greater) in an inert atmosphere such as or nitrogen gas, or in a vacuum. Pyrolysis is most commonly applied to the treatment of organic materials. In general, pyrolysis of organic substances produces volatile products and leaves a solid residue enriched in carbon. "Carbonization" may be considered as a pyrolysis treatment that leaves mostly carbon as the residue, for example, at least 95 wt % carbon or at least 99 wt % carbon, relative to a total weight of the pyrolyzed item.

In one embodiment, the carbonized paper may be formed by heating paper, preferably filter paper, at a temperature of 700-950° C., preferably 750-900° C., more preferably 800-875° C., for 1-12 h, preferably 3-10 h, more preferably 4-8 h, in an atmosphere consisting essentially of inert gas. However, in some embodiments, the paper may be heated at temperatures of lower than 700° C. or greater than 950° C., and/or times shorter than 1 h or longer than 12 h. Preferably, the paper is not immediately transferred from a room temperature environment to a heated environment of 700-950° C., but rather, the paper may be placed in an oven or crucible at room temperature, and then heated at a rate of 4-15° C./min, preferably 5-13° C./min, more preferably 8-11° C./min, or about 10° C./min. However, in some embodiments, the oven or crucible may start at a temperature warmer than room temperature, and/or may be heated at a rate slower than 4° C./min or faster than 15° C./min. Likewise, following the heating, the carbonized paper is preferably cooled to room temperature at a rate of 2-15° C./min, preferably 3-10° C./min, more preferably 4-8° C./min, or about 5° C./min, though in some embodiments, the carbonized paper may be cooled at a rate slower than 2° C./min or faster than 15° C./min.

The "atmosphere consisting essentially of inert gas" means that the space where the paper is heated comprises at least 99.5 vol % inert gas, preferably at least 99.9 vol % inert gas, more preferably at least 99.95 vol % inert gas, relative to the total volume of the space. The inert gas may be nitrogen gas, argon gas, or some other inert gas. Preferably the inert gas is nitrogen gas.

In one embodiment, before the heating, the paper may be cut into pieces having areas of 1-10 cm$^2$, preferably 2-8 cm$^2$, more preferably 3-6 cm$^2$. The paper may be placed in a crucible, such as an alumina crucible, and heated in a tubular furnace, or some other furnace, kiln, or oven. In alternative embodiments, a carbon-rich flat substrate may instead be used to produce a porous, carbonized surface for the NiO nanoparticles. This carbon-rich substrate may be a plastic film, plastic foam, starch, a fabric, a piece of wood, or a flour wafer. In another alternative embodiment, a porous, heat-resistant material, such as glass wool, may be coated with starch or some other carbon-rich material, and then carbonized. In another alternative embodiment, the paper may be fixed or confined against one or more flat surfaces in order to maintain its shape while being heated.

In one embodiment, the carbonized paper or other carbonized material may have a surface area of 50-700 m$^2$/g, preferably 80-500 m$^2$/g, more preferably 100-300 m$^2$/g. Though in some embodiments, the surface area may be smaller than 50 m$^2$/g or greater than 700 m$^2$/g. The carbonized paper or other carbonized material may have a sheet resistance of 0.1-15Ω/sq, preferably 0.5-12Ω/sq, more preferably 3-8Ω/sq, though in some embodiments, the sheet resistance may be smaller than 0.1Ω/sq or greater than 15Ω/sq.

In one embodiment, carbonized paper may comprise microfibers having diameters of 2-15 μm, preferably 3-10 μm, as shown in FIGS. 7A-7D, however, depending on the type of paper used, the carbonized paper may comprise microfibers having diameters greater than 15 μm or smaller than 2 μm.

Following the carbonization, the carbonized paper may be used to make an electrode assembly. Preferably the electrode assembly serves the purposes of providing structural stability to the carbonized paper in an electrolyte solution, while also providing an electrical connection to both the electrolyte solution and the voltage source (such as a potentiostat). This enables a complete circuit in the electrochemical cell. Preferably the carbonized paper may be fixed or adhered to a substrate, such as a glass slide, a plastic film, a plastic sheet, or adhesive tape configured to leave an area exposed and in contact with an electrolyte solution. This area may be considered the filter paper carbonized electrode, or FPCE. In one embodiment, the area may be 0.10-1.00 cm$^2$, preferably 0.15-0.50 cm$^2$ or about 0.2 cm$^2$, however, in some embodiments, the area may be smaller than 0.10 cm$^2$ or greater than 1.00 cm$^2$. An electrical connection may be made by attaching an electrically conductive material, such as aluminum, copper, silver, or steel, in the form of a wire, ribbon, or sheet, to a part of the carbonized paper. The electrically conductive material may then be electrically connected to the voltage source or potentiostat of the electrochemical cell, and preferably this electrically conductive material is insulated from the electrolyte solution. FIG. 1 shows an embodiment of an electrode assembly 4 where a rectangular piece of carbonized paper is attached to a copper tape 1, and both are sandwiched between two pieces of plastic tape 2 (i.e. SCOTCH tape). A hole in one piece of the plastic tape is configured to expose a region 3 of the carbonized paper to the electrolyte solution, while the copper tape stays insulated from the electrolyte solution and provides a connection to the voltage source.

In an alternative embodiment, the carbonized paper may be fit into a frame or a perforated envelope, so that both sides of a single piece of carbonized paper may be exposed to the electrolyte solution. In that embodiment, both sides of the carbonized paper may have NiO nanoparticles deposited. In a related embodiment, two pieces of carbonized paper may be placed together, each with an outer face having deposited NiO nanoparticles.

As part of the electrode assembly, NiO nanoparticles are added to the exposed carbonized paper region. In one embodiment, they may be added to the carbonized paper before fixing the carbonized paper in the tape or other substrate. Preferably, however, the NiO nanoparticles are added after the carbonized paper is secured.

In one embodiment, the NiO nanoparticles may be deposited by drop-drying a solution of NiO nanoparticles onto the exposed carbonized paper. Here, NiO nanoparticles may be dispersed in a liquid to a nanoparticle a concentration of 0.1-5 mg/mL, preferably 0.5-3 mg/mL, more preferably 0.7-1.3 mg/mL, though concentrations lower than 0.1 mg/mL or greater than 5 mg/mL may be used. The liquid may be water, chloroform, hexane, ethanol, methanol, acetone, or some other liquid or solvent that may evaporate at room temperature without unduly reacting with the carbonized paper or the NiO nanoparticles. Preferably the liquid is water. In one embodiment, the NiO nanoparticles may be dispersed by shaking, stirring, sonicating, or bubbling the solution. Preferably the NiO nanoparticles are dispersed by sonication or ultrasonication. The dispersed mixture of NiO nanoparticles may then be dropped, sprayed, spin-coated, spread, or otherwise applied to the exposed surface of the carbonized paper, at a density of 100-200 µg NiO nanoparticles per $cm^2$ exposed electrode ($\mu g/cm^2$), preferably 110-190 $\mu g/cm^2$, more preferably 130-170 $\mu g/cm^2$, or about 150 $\mu g/cm^2$. The applied dispersed mixture may then be left at room temperature for 1-20 h, preferably 3-18 h, more preferably 4-16 h, or for an effective amount of time to dry the dispersed mixture and fix the NiO nanoparticles to the carbonized paper. In one embodiment, the electrode assembly may be placed in a desiccator, with or without a vacuum applied, in order to dry the dispersed mixture.

By incorporating at least one surfactant in the liquid, the NiO nanoparticles may become ordered, for example, by self-assembly. A surfactant may be present in the liquid at a concentration of 1-500 mM, preferably 10-400 mM, more preferably 50-350 mM. The surfactant may be an ionic surfactant, a nonionic surfactant, a biological surfactant, or some other type of surfactant.

Exemplary ionic surfactants include, but are not limited to, (1) anionic (based on sulfate, sulfonate or carboxylate anions), for example, perfluorooctanoate (PFOA or PFO), perfluorooctanesulfonate (PFOS), sodium dodecyl sulfate (SDS), ammonium lauryl sulfate, and other alkyl sulfate salts, sodium laureth sulfate (also known as sodium lauryl ether sulfate (SLES)), alkyl benzene sulfonate, soaps, and fatty acid salts; (2) cationic (based on quaternary ammonium cations), for example, cetyl trimethylammonium bromide (CTAB) (also known as hexadecyl trimethyl ammonium bromide), and other alkyltrimethylammonium salts, cetylpyridinium chloride (CPC), polyethoxylated tallow amine (POEA), benzalkonium chloride (BAC), and benzethonium chloride (BZT); and (3) zwitterionic (amphoteric), for example, dodecyl betaine, cocamidopropyl betaine, and coco ampho glycinate.

Exemplary nonionic surfactants include, but are not limited to, alkyl poly (ethylene oxide), alkylphenol poly (ethylene oxide), copolymers of poly (ethylene oxide) and poly (propylene oxide) (commercially known as Poloxamers or Poloxamines), polyoxyethylene octyl phenyl ether (TRITON X-100®), alkyl polyglucosides, for example, octyl glucoside and decyl maltoside, fatty alcohols, for example, cetyl alcohol and oleyl alcohol, cocamide MEA, cocamide DEA, and polysorbates (commercially known as TWEEN 20, TWEEN 80), for example, dodecyl dimethylamine oxide.

Exemplary biological surfactants include, but are not limited to, micellular-forming surfactants or surfactants that form micelles in solution, for example, DNA, vesicles, phospholipids, and combinations thereof. In other embodiments, other additives may be used to direct the growth of the nanoparticles, such as polyethylene glycol or sodium citrate. In one embodiment, the electrolyte solution comprises polyethylene glycol at a weight percentage of 1-8 wt %, preferably 2-7 wt %, more preferably 3-6 wt % relative to a total weight of the electrolyte solution. However, in some embodiments, the electrolyte solution may comprise polyethylene glycol at a weight percentage less than 1 wt % or greater than 8 wt % relative to a total weight of the electrolyte solution. The polyethylene glycol may have a weight average molecular weight of 0.2-500 kDa, preferably 1-300 kDa, more preferably 2-100 kDa.

In an alternative embodiment, electrocatalysts other than NiO may be deposited on the carbonized paper for use as an electrode. For instance, molybdenum sulfide, quantum dots, perovskite, ITO, or a metal oxide made from any of the previously mentioned metal salts may be deposited as nanoparticles, microparticles, or some other nanostructured material.

In an alternative embodiment, the NiO nanoparticles may be drop-dried or immobilized on a different conductive substrate, such as onto an ITO film or a gold film. In another alternative embodiment, the NiO nanoparticles may be drop-dried or immobilized on a carbon substrate that is not from a pyrolyzed material, for instance, some other carbon electrode may be used.

In an alternative embodiment, the carbon-supported NiO electrode, or some other electrode involving the NiO nanoparticles, may be formed by lithography, more preferably nanolithography. Nanolithography techniques may be categorized as in series or parallel, mask or maskless/direct-write, top-down or bottom-up, beam or tip-based, resist-based or resist-less methods all of which are acceptable in terms of the present disclosure. Exemplary nanolithography techniques include, but are not limited to, optical lithography, photolithography, directed self-assembly, extreme ultraviolet lithography, electron beam lithography, electron beam direct write lithography, multiple electron beam lithography, nanoimprint lithography, step-and-flash imprint lithography, multiphoton lithography, scanning probe lithography, dip-pen nanolithography, thermochemical nanolithography, thermal scanning probe lithography, local oxidation nanolithography, molecular self-assembly, stencil lithography, X-ray lithography, laser printing of single nanoparticles, magnetolithography, nanosphere lithography, proton beam writing, charged particle lithography, ion projection lithography, electron projection lithography, neutral particle lithography and mixtures thereof. In another alternative embodiment, the carbon-supported NiO electrode may be formed by a sol-gel, solvothermal synthesis, or chemical vapor deposition method. In another alternative embodiment, the carbon-supported NiO electrode may be synthesized by two or more techniques, for instance, a nanolithography method and then an electrodeposition method.

In another alternative embodiment, NiO may be formed as an electrode, and then etched to form a nanostructure having an increased surface area appropriate for electrocatalysis.

According to a third aspect, the present disclosure relates to an electrochemical cell, comprising the carbon-supported NiO electrode of the second aspect, a counter electrode, and an electrolyte solution in contact with both electrodes. As used herein, the carbon-supported NiO electrode may be considered the working electrode.

In one embodiment, the electrochemical cell is a vessel having an internal cavity for holding the electrolyte solution. The vessel may be cylindrical, cuboid, frustoconical, spherical, or some other shape. The vessel walls may comprise a material including, but not limited to, glass, polypropylene, polyvinyl chloride, polyethylene, and/or polytetrafluoroethylene, and the vessel walls may have a thickness of 0.1-3 cm, preferably 0.1-2 cm, more preferably 0.2-1.5 cm. The internal cavity may have a volume of 2 mL-100 mL, preferably 2.5 mL-50 mL, more preferably 3 mL-20 mL. In another embodiment, for instance, for small scale or benchtop anodization, the internal cavity may have a volume of 100 mL-50 L, preferably 1 L-20 L, more preferably 2 L-10 L. In another embodiment, for instance, for pilot plant anodization, the internal cavity may have a volume of 50 L-10,000 L, preferably 70 L-1,000 L, more preferably 80 L-2,000 L. In another embodiment, for instance, for industrial plant-scale anodization, the internal cavity may have a volume of 10,000 L-500,000 L, preferably 20,000 L-400,000 L, more preferably 40,000 L-100,000 L. In one embodiment, one or more electrochemical cells may be connected to each other in parallel and/or in series. In another embodiment, the electrolyte solution may be in contact with more than one working electrode and/or more than one counter electrode.

In one embodiment, the counter electrode comprises gold, platinum, or carbon. In a further embodiment, the counter electrode comprises platinum. In one embodiment, the counter electrode may be in the form of a wire, a rod, a cylinder, a tube, a scroll, a sheet, a piece of foil, a woven mesh, a perforated sheet, or a brush. The counter electrode may be polished in order to reduce surface roughness or may be texturized with grooves, channels, divots, microstructures, or nanostructures.

In another further embodiment, where the counter electrode comprises platinum, the counter electrode is in the form of rod or wire. Alternatively, the counter electrode may comprise some other electrically-conductive material such as platinum-iridium alloy, iridium, titanium, titanium alloy, stainless steel, gold, cobalt alloy and/or some other electrically-conductive material, where an "electrically-conductive material" as defined here is a substance with an electrical resistivity of at most $10^{-6}$ Ω·m, preferably at most $10^{-7}$ Ω·m, more preferably at most $10^{-8}$ Ω·m at a temperature of 20-25° C. In another alternative embodiment, the working electrode may not comprise indium, but may comprise any of the previously mentioned metals.

In a preferred embodiment, the counter electrode has at least one outer surface comprising an essentially inert, electrically conducting chemical substance, such as platinum, gold, or carbon. In another embodiment, the counter electrode may comprise solid platinum, gold, or carbon. The form of the counter electrode may be generally relevant only in that it needs to supply sufficient current to the electrolyte solution to support the current required for electrochemical reaction of interest. The material of the counter electrode should thus be sufficiently inert to withstand the chemical conditions in the electrolyte solution, such as acidic or basic pH values, without substantially degrading during the electrochemical reaction. The counter electrode preferably should not leach out any chemical substance that interferes with the electrochemical reaction or might lead to undesirable contamination of either electrode.

In a further embodiment, where the counter electrode comprises platinum, the counter electrode may be in the form of a mesh. In one embodiment, the counter electrode in the form of a mesh may have a nominal aperture or pore diameter of 0.05-0.6 mm, preferably 0.1-0.5 mm, more preferably 0.2-0.4 mm, and/or a wire diameter of 0.01-0.5 mm, preferably 0.08-0.4 mm, more preferably 0.1-0.3 mm. In other embodiments, the counter electrode may be considered a gauze with a mesh number of 40-200, preferably 45-150, more preferably 50-100. In other embodiments, the counter electrode may be in the form of a perforated sheet or a sponge. In one embodiment, the counter electrode may be in the form of a mesh with one or more bulk dimensions (length, width, or thickness) as previously described for the indium foil working electrode.

In one embodiment, the counter electrode is in the form of a rod or wire. The rod or wire may have straight sides and a circular cross-section, similar to a cylinder. A ratio of the length of the rod or wire to its width may be 1,500:1-1:1, preferably 500:1-2:1, more preferably 300:1-3:1, even more preferably 200:1-4:1. The length of the rod or wire may be 0.5-50 cm, preferably 1-30 cm, more preferably 3-20 cm, and a long wire may be coiled or bent into a shape that allows the entire wire to fit into an electrochemical cell. The diameter of the rod or wire may be 0.5-20 mm, preferably 0.8-8 mm, more preferably 1-3 mm. In some embodiments, a rod may have an elongated cross-section, similar to a ribbon or strip of metal.

In one embodiment, the electrolyte solution comprises water and an inorganic base at a concentration of 0.05-0.4 M, preferably 0.07-0.3 M, more preferably 0.08-0.2 M, or about 0.1 M, though in some embodiments, the inorganic base may be present at a concentration of less than 0.05 M or greater than 0.4 M. The inorganic base may be KOH, LiOH, NaOH, $Be(OH)_2$, $Mg(OH)_2$, $Ca(OH)_2$, $Sr(OH)_2$, $Ba(OH)_2$, or some other inorganic base. Preferably the inorganic base is NaOH. In an alternative embodiment, an organic base may be used, such as sodium acetate.

The water may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water and at 25° C. has a conductivity at less than 10 µS·cm$^{-1}$, preferably less than 1 µS·cm$^{-1}$, a resistivity greater than 0.1 MΩ·cm, preferably greater than 1 MΩ·cm, more preferably greater than 10 MΩ·cm, a total solid concentration less than 5 mg/kg, preferably less than 1 mg/kg, and a total organic carbon concentration less than 1000 μg/L, preferably less than 200 μg/L, more preferably less than 50 μg/L.

In one embodiment, the carbon-supported NiO electrode has a current density of 26-35 mA/cm², preferably 27-33 mA/cm², more preferably 28-32 mA/cm² when the electrodes are subjected to a potential of 1.3-1.8 V, preferably 1.4-1.7 V. In some embodiments, the carbon-supported NiO electrode may have a current density of less than 26 mA/cm² when the electrodes are subjected to a potential of less than 1.3, and/or a current density of greater than 35 mA/cm² when subjected to a potential of greater than 1.8 V.

Preferably, to maintain uniform concentrations and/or temperatures of the electrolyte solution, the electrolyte solution may be stirred or agitated during the step of the subjecting. The stirring or agitating may be done intermittently or continuously. This stirring or agitating may be by a magnetic stir bar, a stirring rod, an impeller, a shaking platform, a pump, a sonicator, a gas bubbler, or some other device. Preferably the stirring is done by an impeller or a magnetic stir bar.

In one embodiment, a first carbon-supported NiO electrode may have a higher current density than a second carbon-supported NiO electrode, where the second carbon-supported NiO electrode comprises larger NiO nanoparticles. For example, the NiO nanoparticles of the first electrode may be made by the method of the first aspect of the disclosure, and the NiO nanoparticles of the second electrode may be made by an otherwise identical method that does not use pamoic acid or a pamoic acid salt. Here, over the same range of electrical potential and in similar electrochemical cells, the first carbon-supported NiO electrode may have a current density that is 1-15% higher, preferably 2-12% higher, more preferably 3-10% higher than the current density of the second carbon-supported NiO electrode. This difference in current densities may lead to the first carbon-supported NiO electrode supporting a faster chemical reaction rate in an electrochemical cell.

In one embodiment, the electrochemical cell of claim further comprises a reference electrode in contact with the electrolyte solution. A reference electrode is an electrode which has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper (II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is a silver chloride electrode (Ag/AgCl). However, in some embodiments, the electrochemical cell does not comprise a third electrode.

Figure 9:
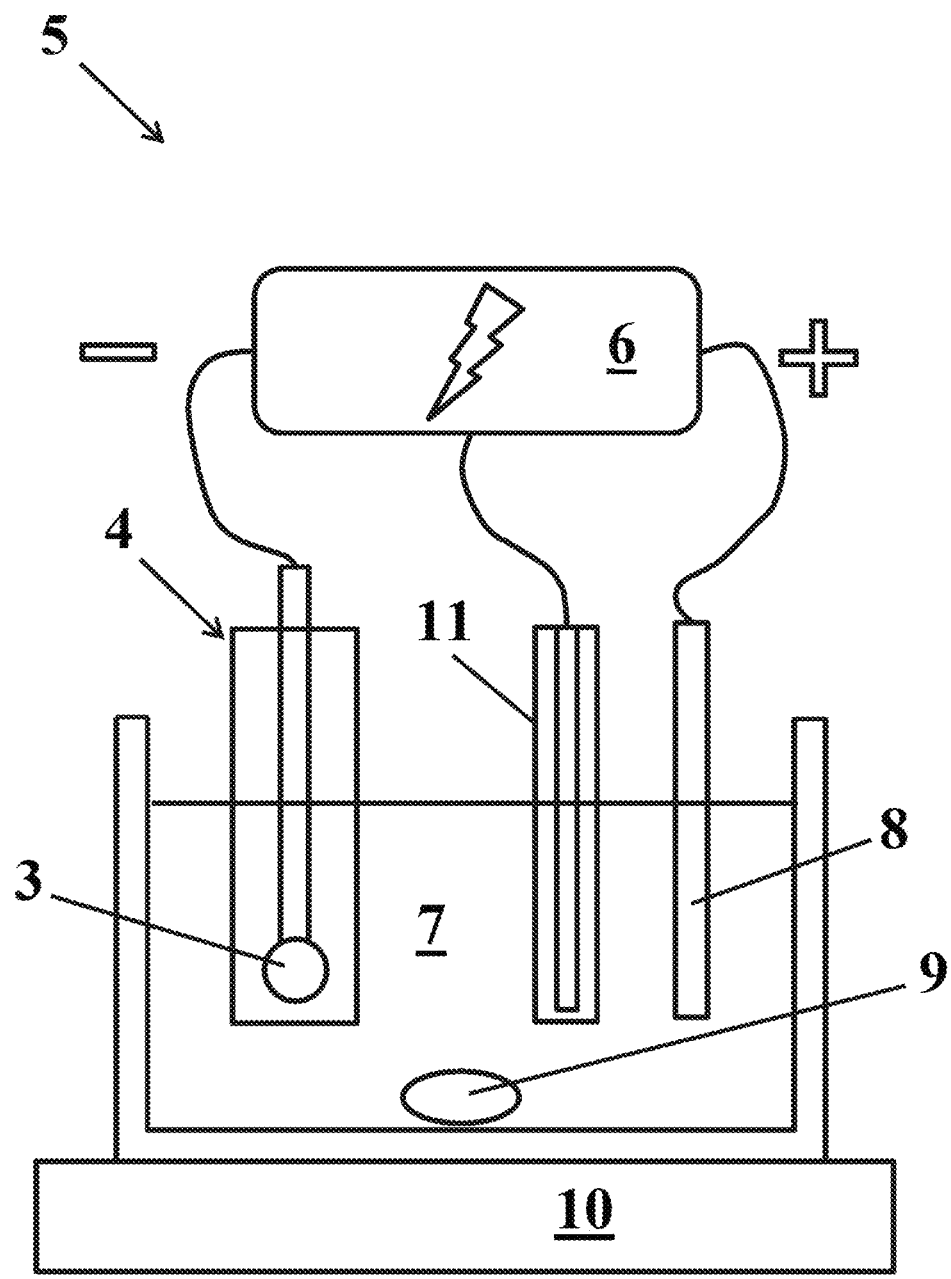
FIG. 9 shows an electrochemical cell that comprises the carbon-supported NiO electrode.

FIG. 9 shows an example electrochemical cell 5 having the electrode assembly 4, the counter electrode 8, and a reference electrode 11 all having electrical connections with the potentiometer 6. The carbon-supported NiO electrode 3, counter electrode 8, and reference electrode 11 are all in contact with the same volume of electrolyte solution 7. The electrochemical cell may include a stir bar 9 and a magnetic stir plate 10 to provide continuous stirring to the electrolyte solution 7. The carbon-supported NiO electrode 3 is configured to receive a negative voltage as a cathode and evolve $H_2$ gas, and the counter electrode 8 is configured to receive a positive voltage as the anode and evolve $O_2$ gas.

According to a fourth embodiment, the present disclosure relates to a method for decomposing water into $H_2$ and $O_2$. This method involves the step of subjecting the electrodes of the electrochemical cell of the third aspect with a potential of 0.5-2.0 V, preferably 0.7-1.5V, more preferably 0.9-1.4 V. Here, "the electrodes" refers to the carbon-supported NiO electrode and the counter electrode. However, in some embodiments, the electrodes may be subjected to a potential of less than 0.5 V or greater than 2.0 V.

Preferably the carbon-supported NiO electrode functions as the cathode, receiving a negative potential to reduce water into $H_2$ gas and OH, while the counter electrode functions as the anode, receiving a positive potential to oxidize OH into $O_2$ gas and $H_2O$. This is summarized by the following reactions:

Cathode (reduction): $2H_2O_{(l)} + 2e^- \rightarrow H_{2(g)} + 2OH^-_{(aq)}$
Anode (oxidation): $4OH^-_{(aq)} \rightarrow O_{2(g)} + 2H_2O_{(l)} + 4e^-$
Overall reaction: $2H_2O_{(l)} \rightarrow 2H_{2(g)} + O_{2(g)}$ In another embodiment, the potentials may be switched, wherein the carbon-supported NiO electrode functions as the anode and receives a positive potential, and the counter electrode functions as the cathode and receives a negative potential. In an alternative embodiment, the electrodes may be subjected to an alternating current (AC) in which the anode and cathode roles are continually switched between the two electrodes.

In one embodiment, the potential may be applied to the electrodes by a battery, such as a battery comprising one or more electrochemical cells of alkaline, lithium, lithium-ion, nickel-cadmium, nickel metal hydride, zinc-air, silver oxide, and/or carbon-zinc. In another embodiment, the potential may be applied through a potentiostat or some other source of direct current, such as a photovoltaic cell. In one embodiment, a potentiostat may be powered by an AC adaptor, which is plugged into a standard building or home electric utility line. In one embodiment, the potentiostat may connect with a reference electrode in the electrolyte solution. Preferably the potentiostat is able to supply a relatively stable voltage or potential. For example, in one embodiment, the electrochemical cell is subjected to a voltage that does not vary by more than 5%, preferably by no more than 3%, preferably by no more than 1.5% of an average value throughout the subjecting. In another embodiment, the voltage may be modulated, such as being increased or decreased linearly, being applied as pulses, or being applied with an alternating current. Preferably, the carbon-supported NiO electrode may be considered the working electrode with the counter electrode being considered the auxiliary electrode. However, in some embodiments, the carbon-supported NiO electrode may be considered the auxiliary electrode with the counter electrode being considered the working electrode.

In one embodiment, the method further comprises the step of separately collecting $H_2$-enriched gas and $O_2$-enriched gas. In one embodiment, the space above each electrode may be confined to a vessel in order to receive or store the evolved gases from one or both electrodes. The collected gas may be further processed, filtered, or compressed. Preferably the $H_2$-enriched gas is collected above the cathode, and the $O_2$-enriched gas is collected above the anode. The electrolytic cell, or an attachment, may be shaped so that the headspace above the carbon-supported NiO electrode is kept separate from the headspace above the reference electrode. In one embodiment, the $H_2$-enriched gas and the $O_2$-enriched gas are not 100 vol % $H_2$ and 100 vol % $O_2$, respectively. For example, the enriched gases may also comprise $N_2$ from air, and water vapor and other dissolved gases from the electrolyte solution. The $H_2$-enriched gas may also comprise $O_2$ from air. The $H_2$-enriched gas may comprise greater than 20 vol % $H_2$, preferably greater than 40 vol % $H_2$, more preferably greater than 60 vol % $H_2$, even more preferably greater than 80 vol % $H_2$, relative to a total volume of the receptacle collecting the evolved $H_2$ gas. The $O_2$-enriched gas may comprise greater than 20 vol % $O_2$, preferably greater than 40 vol % $O_2$, more preferably greater than 60 vol % $O_2$, even more preferably greater than 80 vol % $O_2$, relative to a total volume of the receptacle collecting the evolved $O_2$ gas. In some embodiments, the evolved gases may be bubbled into a vessel comprising water or some other liquid, and higher concentrations of $O_2$ or $H_2$ may be collected. In one embodiment, evolved $O_2$ and $H_2$, or $H_2$-enriched gas and $O_2$-enriched gas, may be collected in the same vessel.

Several parameters for the method for decomposing water may be modified to lead to different reaction rates, yields, and other outcomes. These parameters include, but are not limited to, electrolyte type and concentration, pH, pressure, solution temperature, current, voltage, stirring rate, electrode surface area, size of NiO nanoparticles, carbonized paper porosity, and exposure time. A variable DC current may be applied at a fixed voltage, or a fixed DC current may be applied at a variable voltage. In some instances, AC current or pulsed current may be used. A person having ordinary skill in the art may be able to adjust these and other parameters, to achieve different desired nanostructures. In other embodiments, the electrochemical cell may be used for other electrochemical reactions or analyses.

In an alternative embodiment, the carbon-supported NiO electrode may be used in the field of batteries, fuel cells, photochemical cells, water splitting cells, electronics, water purification, hydrogen sensors, semiconductors (such as field effect transistors), magnetic semiconductors, capacitors, data storage devices, biosensors (such as redox protein sensors), photovoltaics, liquid crystal screens, plasma screens, touch screens, OLEDs, antistatic deposits, optical coatings, reflective coverings, anti-reflection coatings, and/or reaction catalysis. Similarly, in one embodiment, the carbon-supported NiO electrode may be coated with another material. For example, the carbon-supported NiO electrode may be coated with a layer of gold. A gold-coated carbon-supported NiO electrode may then be used for analyte detection using surface enhanced Raman scattering (SERS).

The examples below are intended to further illustrate protocols for preparing, characterizing NiO nanoparticles and carbon-supported NiO electrode, and uses thereof, and are not intended to limit the scope of the claims.

Example 1

Experimental—Materials

Nickel (II) nitrate hexahydrate ($Ni(NO_3)_2 \cdot 6H_2O$) was supplied by Merck. Pamoic acid disodium salt ($Na_2PA$), sodium hydroxide (NaOH), and filter papers were obtained from Sigma-Aldrich. Ethanol was purchased from Hayman Ltd., Eastways Park, UK. Copper tape (one-sided adhesive) and SCOTCH 898 premium-grade Filament Tape (one-sided adhesive) were obtained from 3M, United States.

Example 2

Experimental—Preparation of the Filter Paper Derived Carbon Electrode (FPCE)

Initially, the filter papers were cut into pieces, 2 cm×2 cm. The cut pieces were loaded onto a flat alumina crucible. The crucible was then transferred to the middle of the alumina tube in a tubular furnace. Both sides of the tube were locked, and the system was flushed with copious amounts of nitrogen ($N_2$) gas for five minutes to create an inert environment. Next, the system was purged with $N_2$, drop by drop, and the system was heated at a rate of 10° C./minute until a temperature of 850° C. was reached. After incubation at 850° C. for 5 h, the sample was cooled at a rate of 5° C./min until reaching room temperature (RT). Finally the prepared FPCE was removed from the furnace. A useable working electrode was crafted by attaching one side of the prepared FPCE to the conducting copper tape and covering the FPCE with SCOTCH tape, leaving a 0.2 cm$^2$ area (working electrode area) and the end of the copper tape uncovered to allow connection to a potentiostat. See M. A. Aziz, D. Theleritis, M. O. Al-Shehri, M. I. Ahmed, M. Qamaruddin, A. S. Hakeem, A. Helal, M. A. A. Qasem, ChemistrySelect 2, 4787-4793 (2017), incorporated herein by reference in its entirety. The usable FPCE is illustrated in FIG. 1.

Example 3

Experimental-Preparation of NiONPs and the NiONP-Modified FPCE

First, 400 mg $Ni(NO_3)_2 \cdot 6H_2O$ was added to a glass beaker containing 50 mL ethanol, and the mixture was sonicated for 10 minutes. Then 350 mg of the $Na_2PA$ was added to the mixture (reaction mass) and sonicated for another 30 minutes. The beaker containing the reaction mass was transferred to a hot-plate so that the sample was heated at 65° C. with stirring (300 rpm) to evaporate the ethanol. The obtained mass was dried overnight in an oven at 40° C. The dried mass was transferred to an alumina crucible and placed in the glass tube of a tubular furnace. The position of the crucible in the middle of the tubular furnace was confirmed. Next, the furnace was heated under atmospheric conditions at a heating rate of 10° C./min until reaching 520° C., unless mentioned otherwise. This temperature was maintained for 3 h, after which the sample was cooled at a rate of 5° C./min until reaching room temperature. Finally, the NiONPs were collected. Separately, NiONPs were prepared according to the same protocol without adding $Na_2PA$.

The NiONPs prepared with $Na_2PA$ were dispersed to a concentration of 1 mg/mL in water via ultrasonication. Thirty microliters of the dispersed of NiONPs were dropped onto the working electrode area of the FPCE (the exposed FPCE area 3 shown in FIG. 1) and the assembly was dried at RT to obtain a NiONP-modified FPCE. Similarly, a NiONP-modified FPCE was formed using the NiONPs prepared without $Na_2PA$.

Example 4

Experimental—Instrumentation

Electrochemical data were obtained using a CHI (760E) electrochemical workstation. The prepared bare FPCE and NiONP-modified FPCE were used as the working electrodes. A Pt wire and Ag/AgCl electrode served as counter and reference electrodes, respectively. All electrochemical experiments were carried out at room temperature without deaeration. Fourier transform infrared spectra (FTIR) were recorded using a Nicolet 6700 spectrometer, Thermo Scientific, USA. TGA-DSC analysis was carried out using a Netzsch STA (Model STA 449 F3). FESEM images were recorded using a field emission scanning electron microscope (TESCAN LYRA 3, Czech Republic). TEM images were recorded using a high-resolution transmission electron microscope (HRTEM) (JEM-2011, Jeol Corp.) equipped with CCD camera 4 k×4 k (Ultra Scan 400SP, gatan cop.). An XPS equipped with an Al-Ka microfocusing X-ray monochromator (ESCALAB 250Xi XPS Microprobe, Thermo Scientific, USA) was used for the chemical analysis. X-ray diffraction patterns (XRD) of the NiONPs were obtained using a high-resolution Rigaku Ultima IV diffractometer equipped with Cu-Ka radiation.

Example 5

Figure 2A:
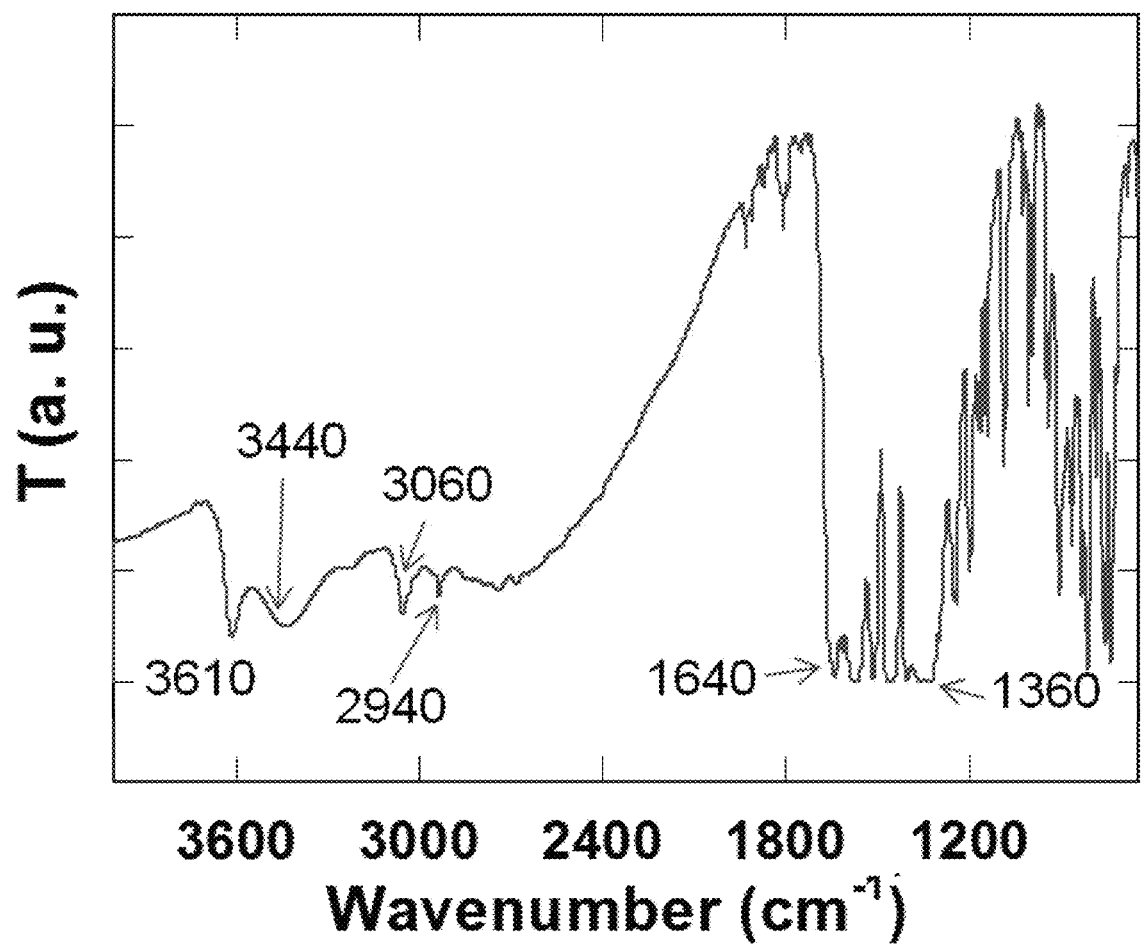
FIG. 2A is an FT-IR spectrum of a dried mass after mixing $Na_2PA$ and $Ni(NO_3)_2 \cdot 6H_2O$ and drying to remove ethanol.
Figure 2B:
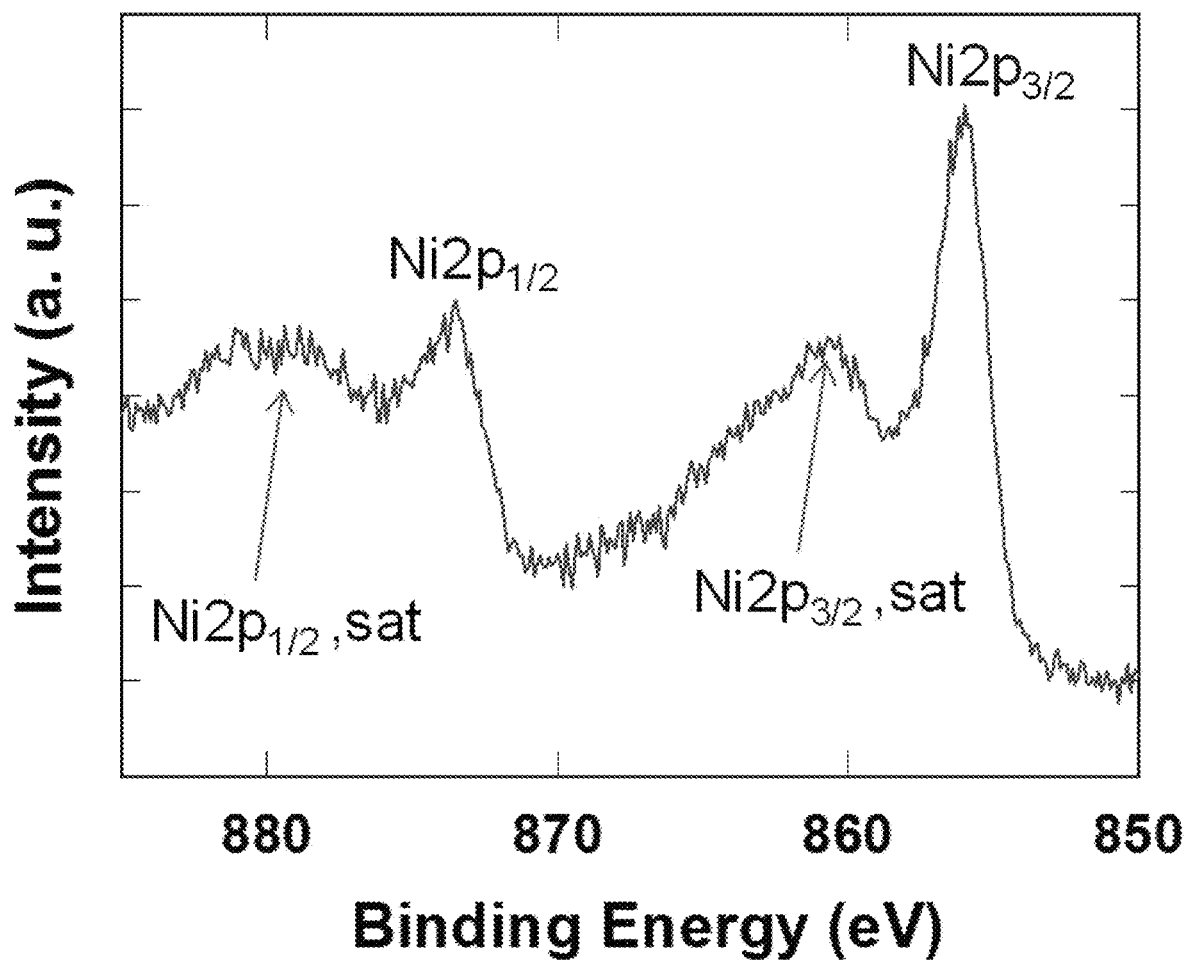
FIG. 2B is an XPS spectrum of a dried mass after mixing $Na_2PA$ and $Ni(NO_3)_2 \cdot 6H_2O$ and drying to remove ethanol.

Results and Discussion—Interaction between the Na$_2$PA and Ni(NO$_3$)$_2$·6H$_2$O Initially, Na$_2$PA and Ni(NO$_3$)$_2$·6H$_2$O were mixed in ethanol. The ethanol was evaporated away with heating. The interaction between Ni$^{2+}$ and Na$_2$PA was explored using FTIR (FIG. 2A) and XPS (FIG. 2B) analysis of the dried mass. The IR spectrum revealed characteristic peaks at 3610, 3410, 3060, 2940, 1640, 1580, 1520, 1460, 1400, 1360, 1240, 1200, and 820 cm$^{-1}$. The peaks at 3610, 3410, 3060, and 2940 cm$^{-1}$ indicated the presence of aromatic —OH groups, coordinated H$_2$O, aromatic H—C, and H—CH— functional groups, respectively. The peaks at 1640 and 1360 cm$^{-1}$ were attributed to $v_{as}$(COO$^-$) and $v_s$(COO$^-$), respectively. The $\Delta(v_{as}-v_s)$ value of 280 cm$^{-1}$ was assigned to the bis-monodentate chelation mode of the carboxylate group to Ni, as shown in Structure-2. See X. Shi et al., incorporated herein by reference in its entirety. These findings confirmed complex formation with the Ni transitional metal.

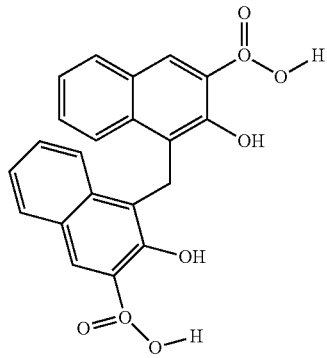

Structure-2

Plausible structure of the complex formed in the interaction with Ni(NO$_3$)$_2$ and Na$_2$PA.

The formation of the Ni—O bond was further confirmed by recording the XPS of the dried mass. The XPS spectrum revealed the binding energy peak positions at 856.0, 860.3, 873.5, and 879.4 eV, assigned to the Ni2p$_{3/2}$, Ni2p$_{3/2(sat)}$, Ni2p$_{1/2}$, Ni2p$_{1/2(sat)}$ binding energies, which were comparable to the binding energies of Ni(acetate)$_2$·4H$_2$O and NiO. See L. J. Matienzo, L. I. Yin, S. O. Grim, W. E. Swartz, Inorganic Chemistry 12, 2763-2769 (1973); J. A. Schreifels, P. C. Maybury, And W. E. Swartz, Jr, Journal Of Catalysis 65, 195-206 (1980); A. M. Venezia, R. Bertoncello, G., Deganello Surf. Interface Anal. 23, 239-247 (1995); and A. N. Mansour, Surf. Sci. Spectra 3, 231 (1994), each incorporated herein by reference in their entirety. That is, a Ni—O bond was present in the complex. A plausible structure of the complex is illustrated as Structure-2. The dried mass prepared by mixing Na$_2$PA and Ni(NO$_3$)$_2$·6H$_2$O was denoted the Ni-PA complex.

Example 6

Results and Discussion—TGA Analysis of the Ni-PA Complex

Figure 3:
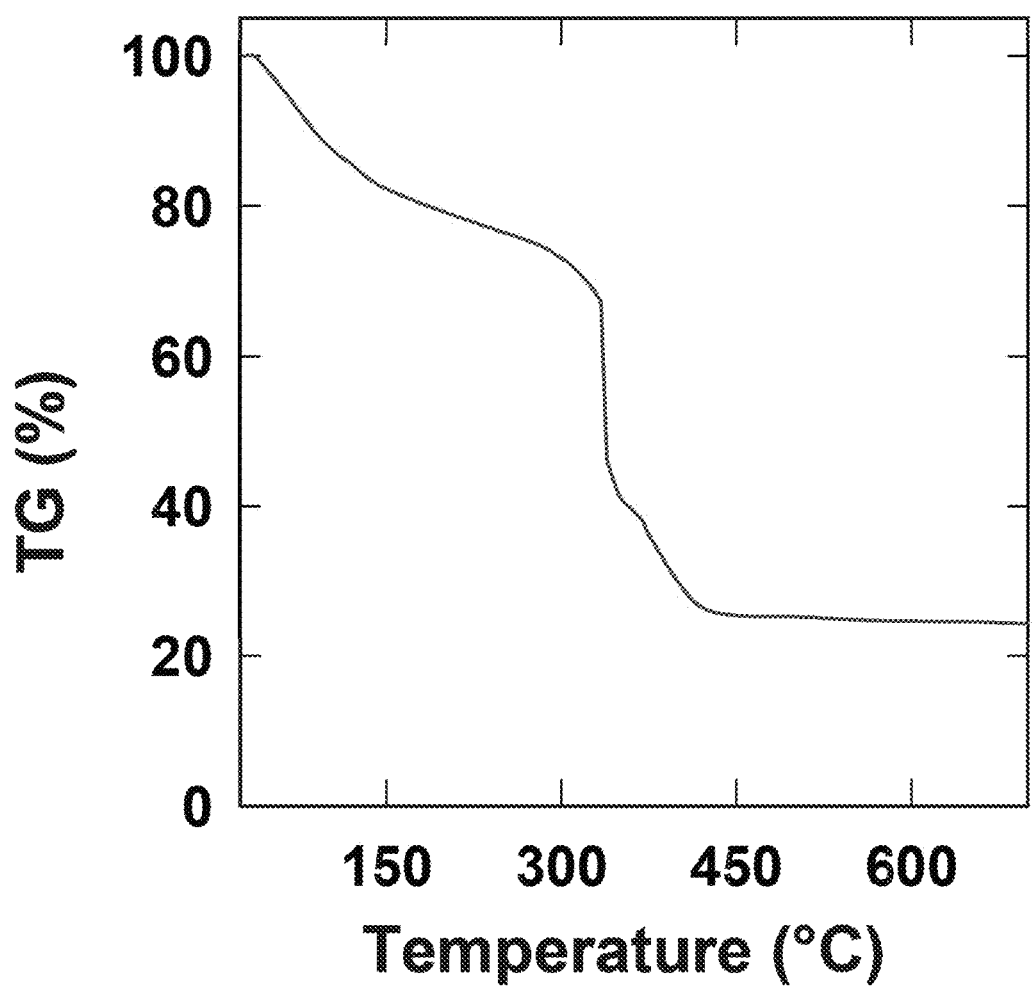
FIG. 3 is a TGA curve of a Ni-PA complex.

Prior to the thermal decomposition of the Ni-PA complex for NiO preparation, TGA analysis was performed to test different decomposition temperatures. Slow weight losses were observed with increasing temperature up to 300° C. (FIG. 3). This weight loss was attributed to the elimination of loosely-bound solvent molecules, crystalline water, and the decomposition of some fraction of Na$_2$PA. Significant sharp weight losses observed in the range 300-420° C. were attributed to the decomposition of the remaining parts of the Na$_2$PA and NO$_3^2$-structures. At temperatures exceeding 420° C., the weight remained nearly constant. The total weight loss at 420° C. was ~25%. These findings indicated that the complete conversion of Ni-PA to NiO occurred at temperatures of 420° C. and above. As a result, a temperature ≥420° C. was chosen for the thermal decomposition of the Ni-PA complex to prepare the NiONPs.

Example 7

Figure 4:
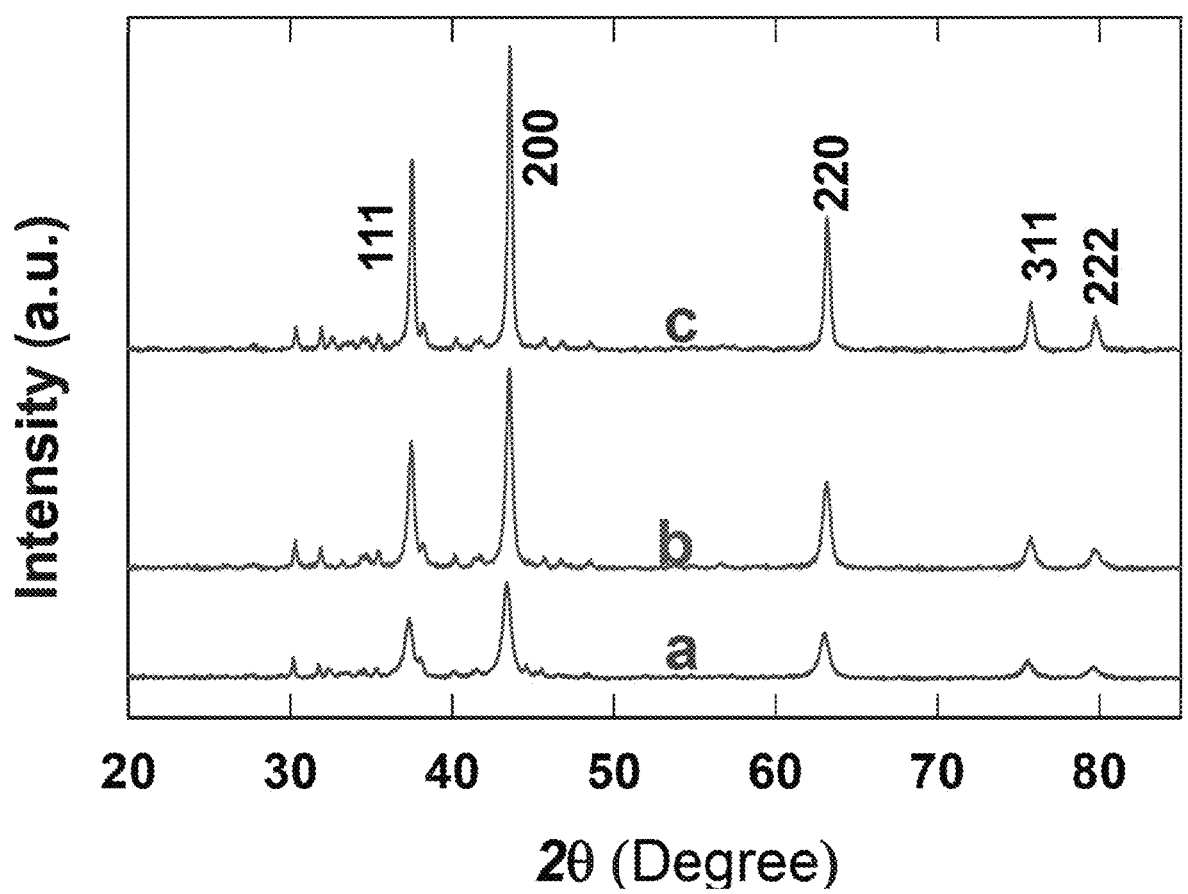
FIG. 4 shows XRD patterns of NiO nanoparticles prepared by thermal decomposition of the Ni-PA complex at a temperature of (a) 420° C., (b) 520° C., and (c) 620° C.

Results and Discussion-Structural and Morphological Characterization of the Prepared NiONPs
Effect of the Extent of Heat Treatment on the Crystallinity of the NiONPs The TGA analysis revealed that the NiO formed upon decomposition of the Ni-PA complex at temperatures greater than or equal to 420° C.; therefore, we heated the Ni-PA complex at a low temperature, 420° C., in air for 3 h. After cooling, the product was subjected to XRD analysis. FIG. 4, "a" shows that the major peaks occurred at 2θ values of 37.25, 43.40, 62.20, 75.52, and 79.56°, corresponding to the 111, 200, 220, 311, and 322 crystal planes, indicating the formation of cubic NiO (bunsenite, NaCl-type structure) (JPCDS card No. 01-071-1179). As the heat treatment temperature was increased, the intensities of the peaks increased without changing the pattern; that is, the crystallinity and phase purity of the NiO increased with the extent of heat treatment within the temperature zone tested (FIG. 4, "a"-"c"). By considering the extent of temperature and crystallinity, 520° C. was chosen to form NiO in all subsequent experiments.

Morphological Characterization of the NiONPs Prepared at 520° C.

Figure 5A:
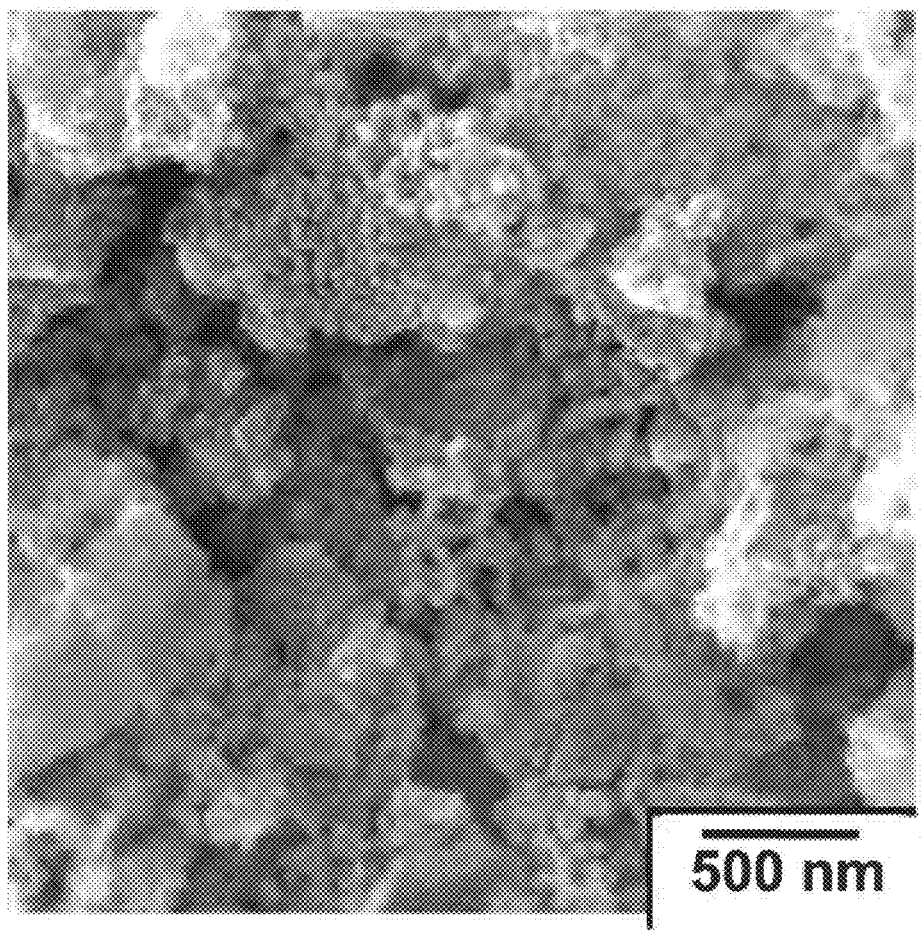
FIG. 5A is an SEM image of NiO nanoparticles prepared by the thermal decomposition of the Ni-PA complex at 520° C.
Figure 5B:
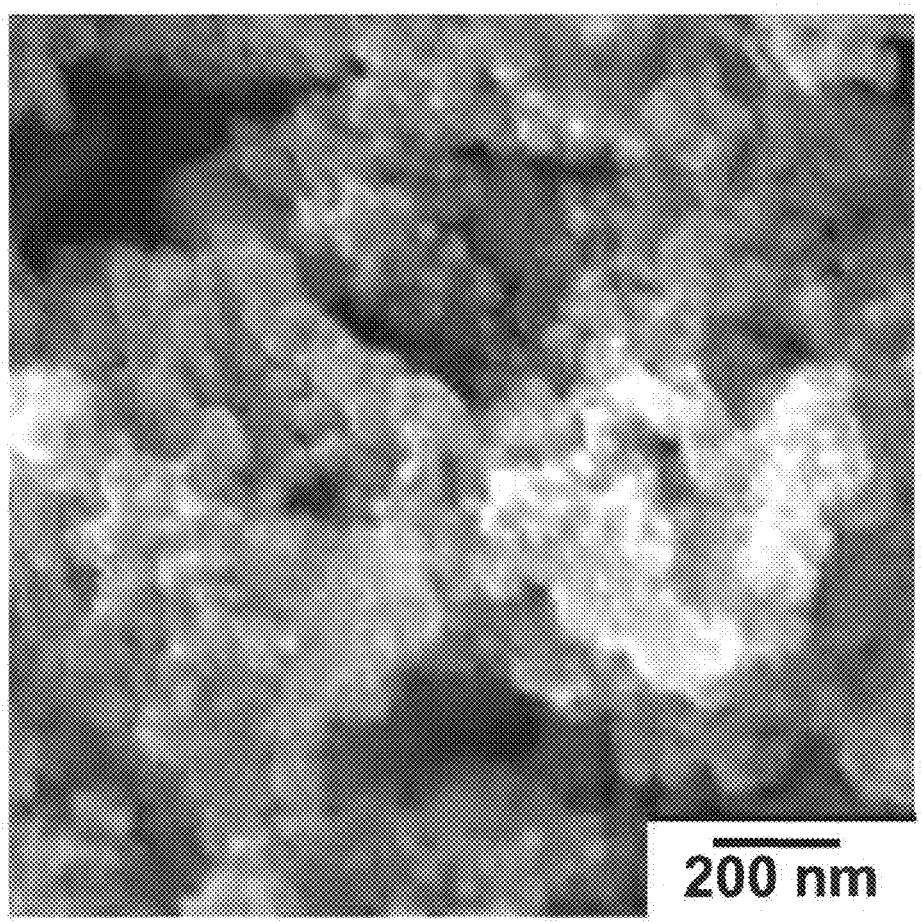
FIG. 5B is a magnified view of the sample in FIG. 5A.
Figure 5C:
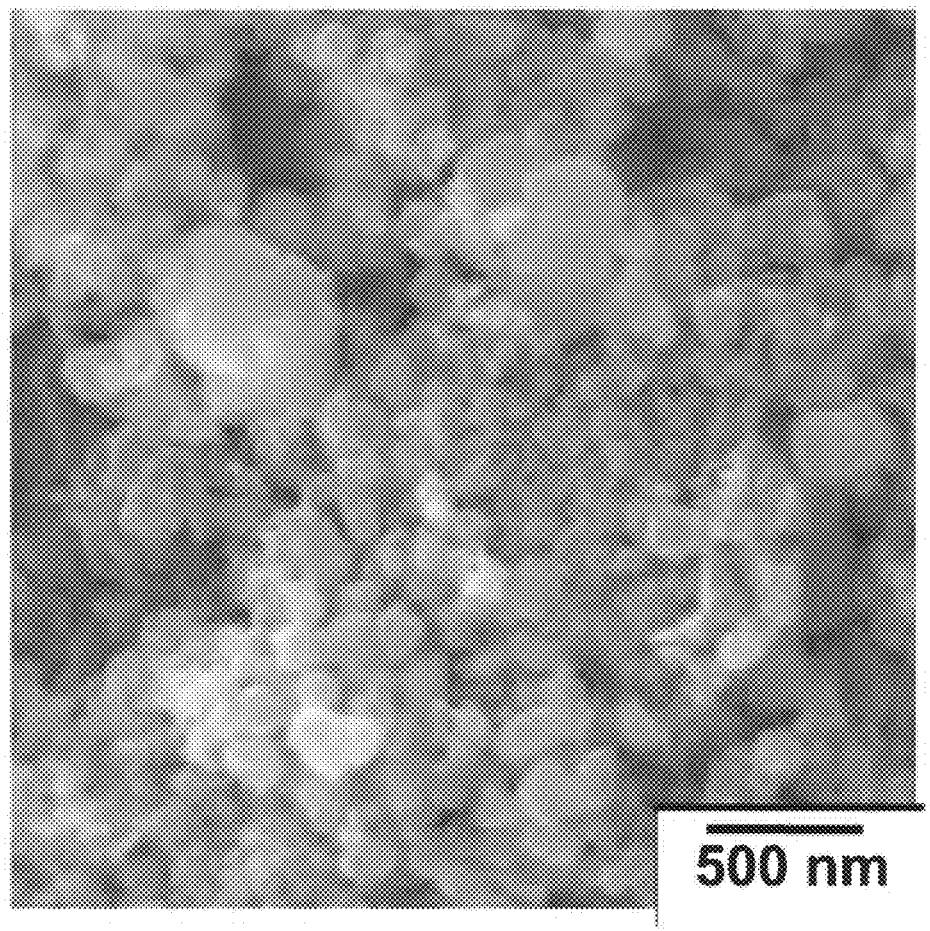
FIG. 5C is an SEM image of NiO nanoparticles prepared by the thermal decomposition of $Ni(NO_3)_2$ at 520° C., without using $Na_2PA$.
Figure 5D:
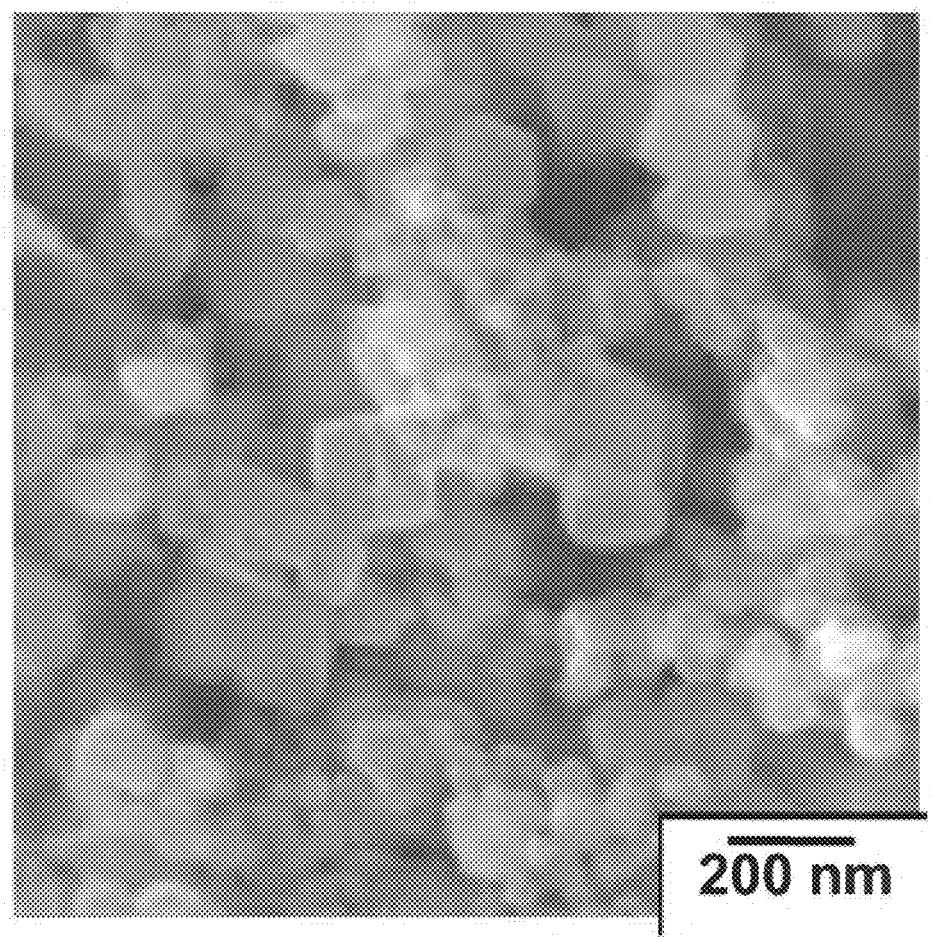
FIG. 5D is a magnified view of the sample in FIG. 5C.

FIG. 5a shows an FESEM image of the NiO prepared using Na$_2$PA, and FIG. 5B shows a magnified view of FIG. 5A. These images show that the particles were nearly monodisperse NPs. The NiONP size was determined from the TEM images, discussed below. The effect of using Na$_2$PA was verified by following the fabrication protocol without adding Na$_2$PA. The solvent, ethanol, could form a complex and generate NiONPs upon thermal combustion with the divalent nickel salt in the absence of a ligand. FIG. 5C shows an FESEM image of the NiO prepared without using Na$_2$PA. FIG. 5D shows a magnified view of FIG. 5C. FESEM images revealed that the NiONPs formed without Na$_2$PA were much larger (FIGS. 5C and 5D) than the NiONPs obtained in the presence of Na$_2$PA (FIGS. 5A and 5B). It should be noted that the NiONPs formed without Na$_2$PA were polydisperse in terms of both shape and size. The phase of the NiONP prepared without using Na$_2$PA was confirmed by XRD experiments (data not shown). The XRD data revealed that the NiONPs prepared without Na$_2$PA were more crystalline than those prepared with Na$_2$PA. Although large polydisperse NiONPs (spherical, cubic, pentagonal shapes; 23-284 nm in size) were obtained without using Na$_2$PA, this approach provides an inexpensive route to the formation of size- and shape-controlled metal oxide NPs. Selection of different metal precursors may increase the monodispersity of the metal oxide NPs prepared using ethanol.

Figure 6A:
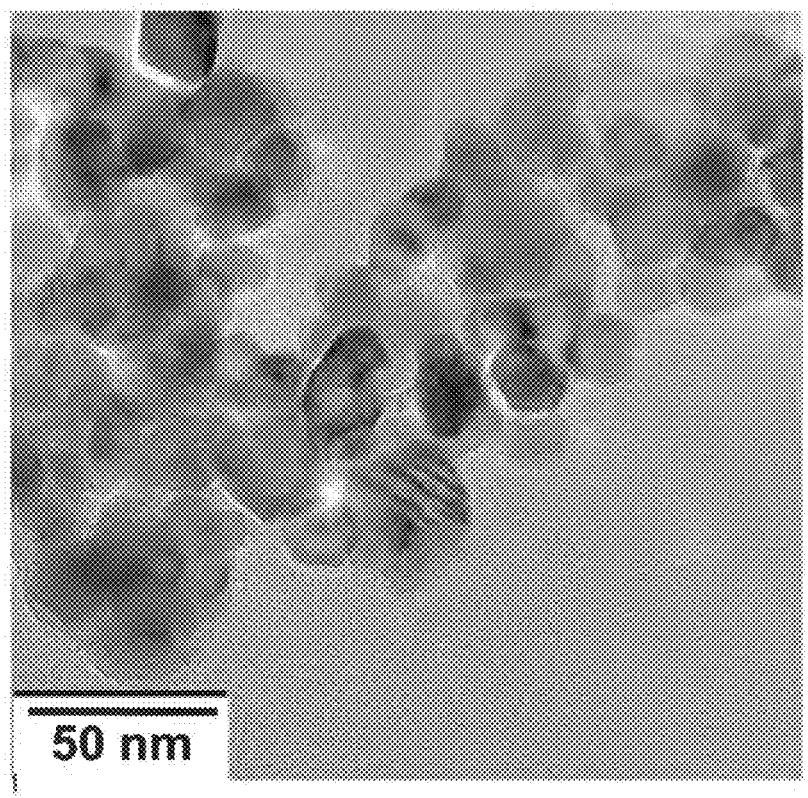
FIG. 6A shows a TEM image of NiO nanoparticles prepared by the thermal decomposition of the Ni-PA complex at 520° C.
Figure 6B:
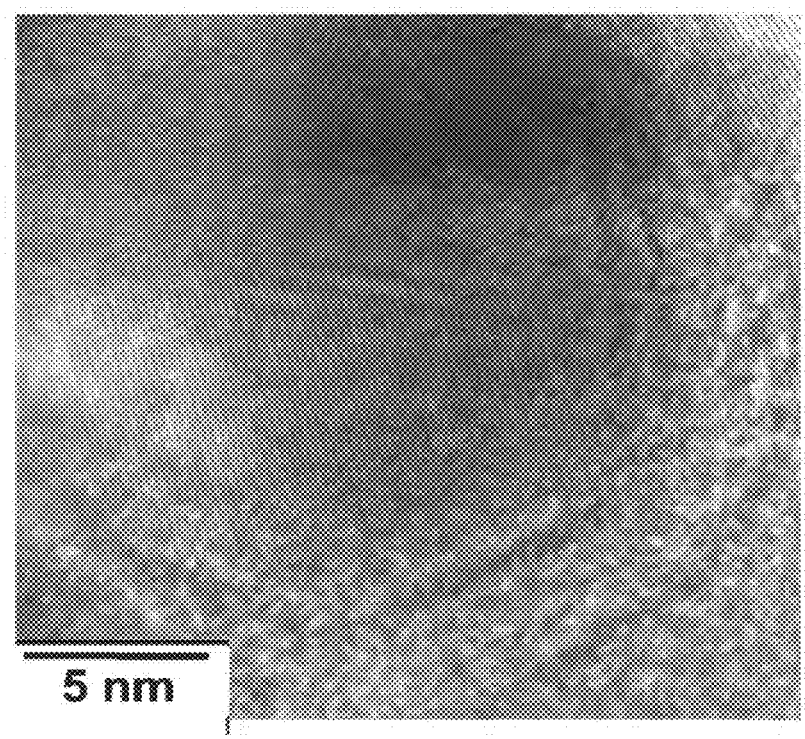
FIG. 6B shows a HRTEM image of NiO nanoparticles prepared by the thermal decomposition of the Ni-PA complex at 520° C.
Figure 6C:
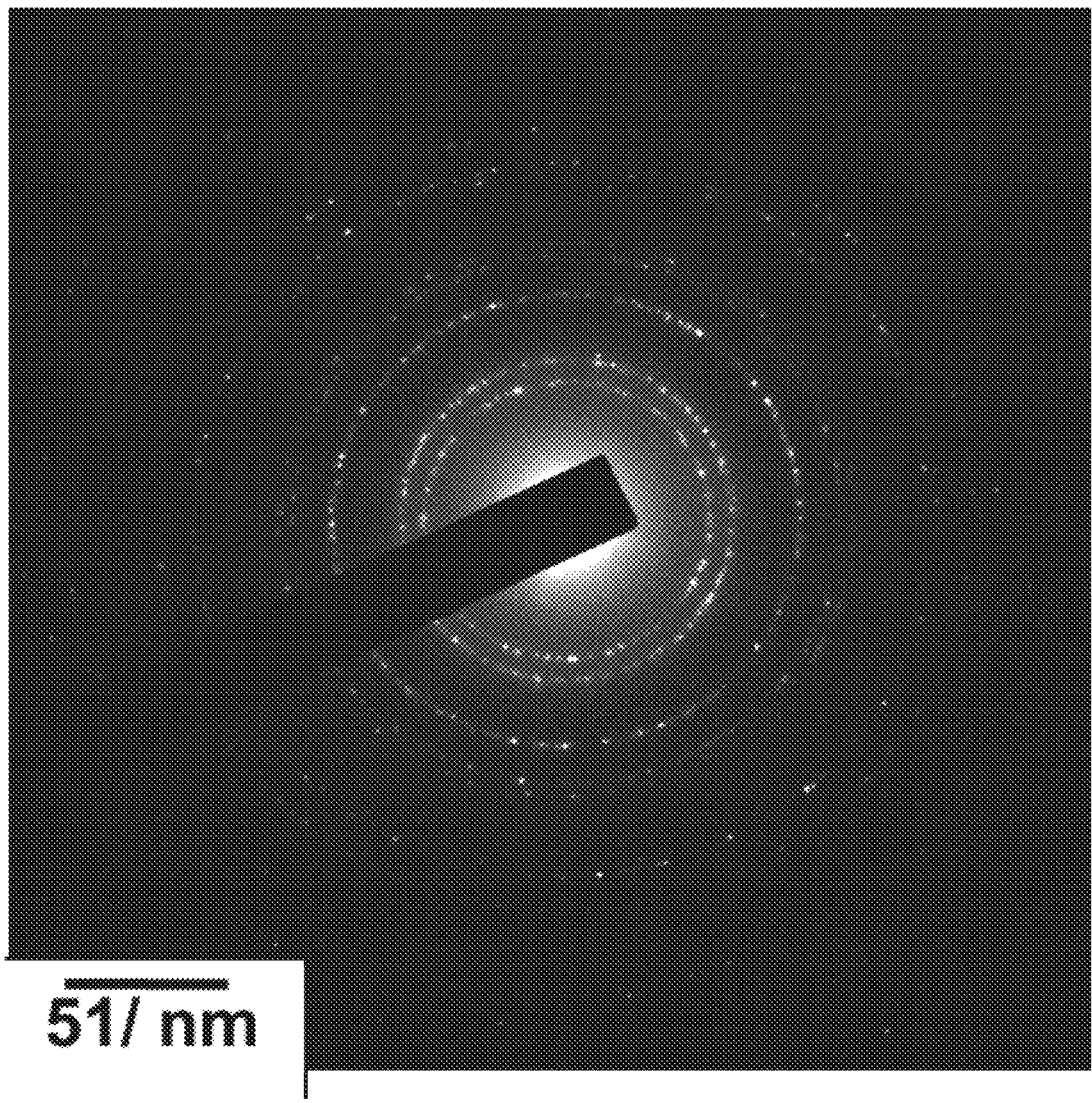
FIG. 6C shows SAED data collected from NiO nanoparticles prepared by the thermal decomposition of the Ni-PA complex at 520° C.

The NP size could be estimated from the FESEM images shown in FIGS. 5A and 5B. TEM images (FIG. 6A) permitted more precise particle size measurements. The average NiONP particle size prepared with Na$_2$PA, calculated from the TEM images, was 19.1±3.2 nm. FIGS. 6B and 6C show, respectively, HRTEM images and selected area diffraction patterns (SAED) of the NiONPs prepared with Na$_2$PA. The interplanar distance was determined to be 0.2173 nm (FIG. 6B), which was close to the interplanar spacing (0.21 nm) measured over 200 planes of NiO (bunsenite). See U. Kwon, B. Kim, D. C. Nguyen, J. Park, N. Y. Ha, S. Kim, S. H. Ko, S. Lee, D. Lee, H. J. Park, Scientific Reports, 6:30759 (2016) DOI: 10.1038/srep30759. The SAED data also revealed higher-order crystallinity that was correlated with the XRD data (FIG. 4).

Example 8

Figure 7A:
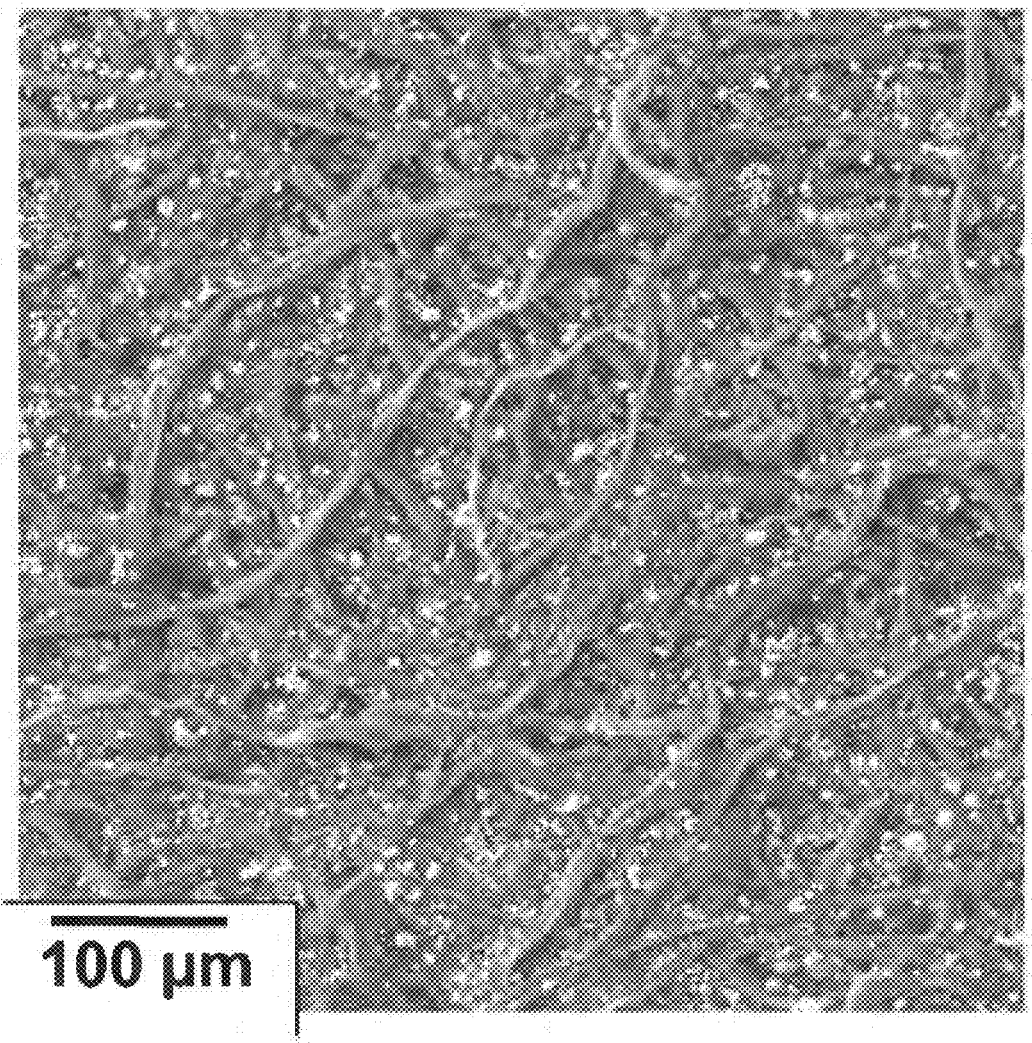
FIG. 7A shows a FESEM image of a FPCE modified with NiONPs prepared with $Na_2PA$.
Figure 7B:
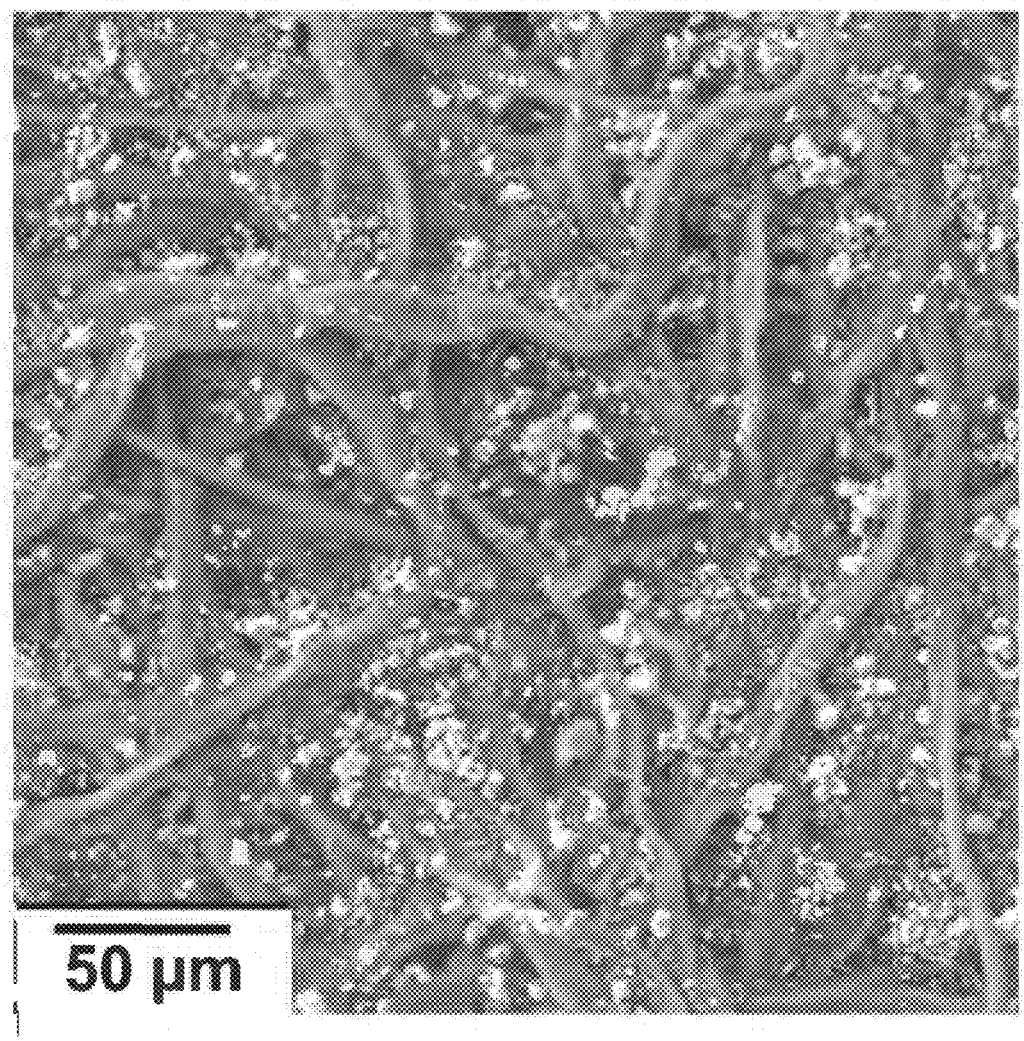
FIG. 7B shows a magnified view of the sample in FIG. 7A.
Figure 7C:
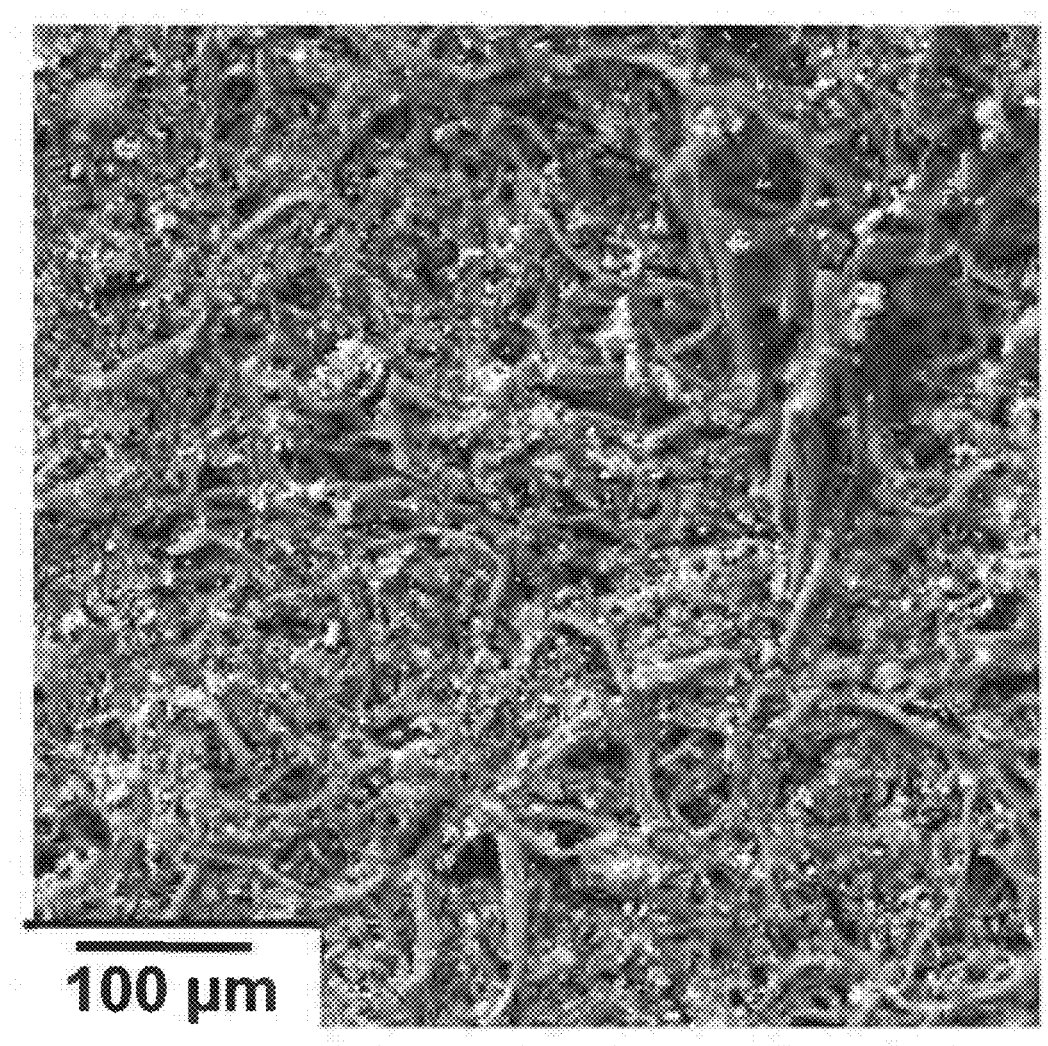
FIG. 7C shows a FESEM image of a FPCE modified with NiONPs prepared without $Na_2PA$.
Figure 7D:
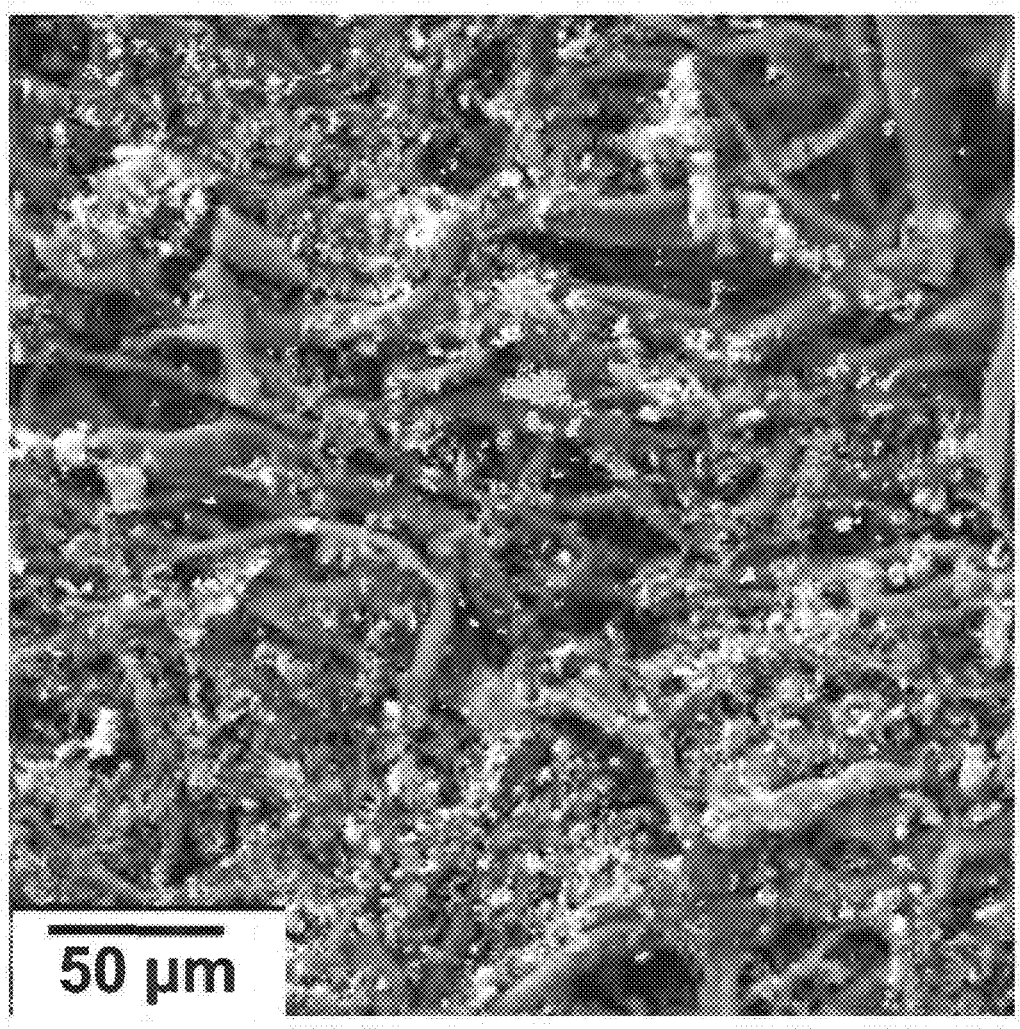
FIG. 7D shows a magnified view of the sample in FIG. 7C.

Results and Discussion—Morphological Characterization of the NiONPs-Modified FPCE FPCE was used as a substrate electrode rather than the commonly employed GCE because FPCE constitutes an interconnected micro-nanostructured carbon form with a high electroactive surface area (ECSA), as confirmed by FESEM images and surface area calculations by cyclic voltammetry techniques (data not shown). The distribution of NiONPs on the FPCE surfaces was examined using FESEM imaging at low magnifications (FIGS. 7A-7D) as the sizes of the synthesized NiONPs were described in detail above. FIGS. 7A and 7B show FESEM images of the FPCE modified with NiONPs prepared with Na$_2$PA, and FIGS. 7C and 7D show FESEM images of the FPCE modified with NiONPs prepared without Na$_2$PA. The white grains indicate NiONPs, and the background corresponds to the FPCE. The FESEM images revealed that both types of NiONPs were distributed as small cluster. Interestingly, the small clusters were distributed homogeneously across the surface (they did not aggregate as big cluster in certain areas). The big cluster formation of NPs in certain areas on a bare solid substrate during immobilization via drop-drying methods is very common and prohibits use of this method in many applications. See M. Majumder, C. S. Rendall, J. A. Eukel, J. Y. L. Wang, N. Behabtu, C. L. Pint, T. Liu, A. W. Orbaek, F. Mirri, J. Nam, A. R. Barron, R. H. Hauge, H. K. Schmidt, M. Pasquali, J. Phys. Chem. B 116, 6536-6542 (2012); R. Duggal, F. Hussain, M. Pasquali, Adv. Mater 18, 29-34 (2006); and M. A. Aziz, W. Mahfoz, M. N. Shaikh, M. H. Zahir, A. Al-Betar, M. Oyama, D. Theleritis, Z. H. Yamani, Electroanalysis 29, 1683-1690 (2017), each incorporated herein by reference in their entirety. The homogenous distribution of NiONPs (as small cluster) on the FPCE may have resulted from the presence of the micro-nanostructured cavities on the FPCE. These cavities may have hindered NP to form big cluster during drying.

Example 9

Figure 8:
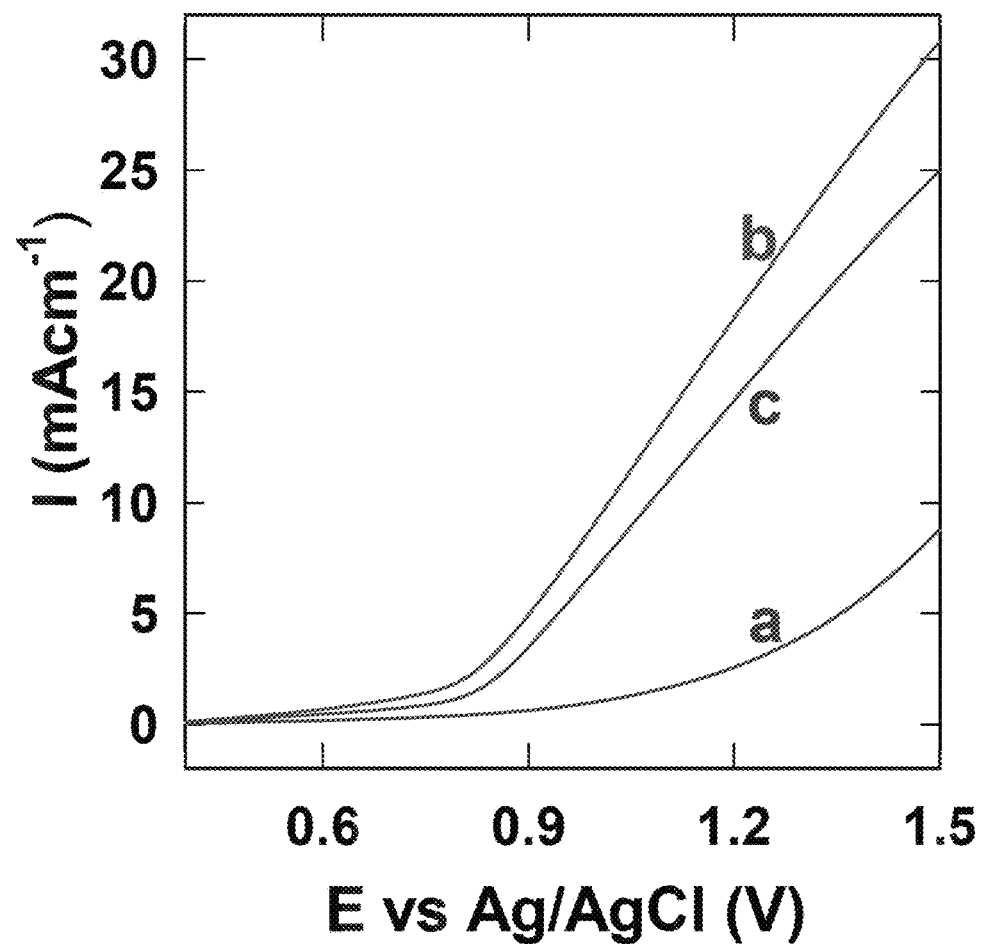
FIG. 8 shows a linear sweep voltammogram (LSV) of (a) a bare FPCE, (b) a FPCE modified with NiONPs prepared with $Na_2PA$, and (c) a FPCE modified with NiONPs prepared without $Na_2PA$.

Results and Discussion—Electrocatalytic Activities Toward Water Electrolysis in an Alkaline Medium FIGS. 8a-8c show linear sweep voltammograms (LSVs) of the bare FPCE and the FPCEs modified with NiONPs prepared with or without Na$_2$PA. The three LSVs reveal that the electrocatalytic activities toward water electrolysis increased upon immobilization of NiONPs onto FPCE to a different extent, depending on whether the NiONPs were prepared with or without Na$_2$PA. The FPCE modified with NiONPs prepared with Na$_2$PA showed a higher electrooxidation current compared to that measured at the FPCE modified with NiONPs prepared without Na$_2$PA. The water electrooxidation current densities at 1.5 V were 8.80, 30.81, and 24.98 mA·cm$^{-1}$ for the bare FPCE, FPCE modified with NiONPs prepared with Na$_2$PA, and FPCE modified with NiONPs prepared without Na$_2$PA, respectively. It should be noted that both modified FPCEs showed the same water electrooxidation potential, 0.5 V, which was 400 mV lower than the water electrooxidation potential of bare FPCE, 0.9 V. The higher electrocatalytic activity of the NiONP (with Na$_2$PA)-FPCE occurred because the NiONPs prepared with Na$_2$PA were smaller than those prepared without Na$_2$PA.

A thermal decomposition method for preparing monodisperse NiONPs using Ni(NO$_3$)$_2$·6H$_2$O as a nickel precursor and Na$_2$PA as a complexing agent was developed. Prior to thermal decomposition, a nickel precursor, Ni(NO$_3$)$_2$·6H$_2$O, was mixed with Na$_2$PA in ethanol, and the ethanol was evaporated to obtain the dried reaction mass. The dried reaction mass was characterized using Fourier transform infrared spectroscopy, X-ray photoelectron spectroscopy, and thermal gravimetric analysis. Thermal decomposition was then performed in air to obtain the NiONPs. The role of Na$_2$PA in the synthesis of NiONP was evaluated by preparing the NiONPs according to the protocol described above without the addition of Na$_2$PA. The average NP size was much larger than that obtained with the addition of Na$_2$PA. The electrocatalytic activities of both NiONPs toward electrooxidation in an alkaline medium were evaluated after immobilization on an FPCE using a drop-drying method. The NiONP(with Na$_2$PA)-FPCE showed a significantly higher electrocatalytic activity toward water electrooxidation than the NiONP(without Na$_2$PA)-FPCE or bare FPCE. The superior electrocatalytic properties of the NiONP(with Na$_2$PA)-FPCE likely resulted because these NPs were small and monodisperse. The monodisperse small NPs described here could play an important role in catalysis, electronics, optoelectrical device, and electrochemical applications, including electrochemical sensors, biosensors, gas sensors, batteries, capacitors, solar cells, fuel cells, and water splitting cells.

The invention claimed is:
1. A carbon-supported NiO electrode, comprising:
carbonized paper and
NiO nanoparticles having an average particle size of 5-40 nm, deposited on the carbonized paper,
wherein the carbon-supported NiO electrode is substantially free of Ni$^0$,
wherein the NiO nanoparticles have an aspect ratio of 1:1-1.5:1,
wherein a density of the NiO nanoparticles on the carbonized paper is 100-200 μg/cm$^2$, wherein the NiO nanoparticles are aggregated into clusters having diameters of 1-15 µm, and wherein the clusters have a nearest neighbor distance of 500 nm-5 µm.

2. The carbon-supported NiO electrode of claim 1, wherein the NiO nanoparticles are made by a method comprising:

mixing a nickel salt, pamoic acid or a pamoic acid salt, and an alcohol to form a dispersed mixture;

drying the dispersed mixture to produce a dried mass; and heating the dried mass in air at a temperature of 420-700° C. for 1-6 h to produce the NiO nanoparticles.

3. The carbon-supported NiO electrode of claim 1, wherein the NiO nanoparticles are monodisperse.

4. The carbon-supported NiO electrode of claim 1, wherein the NiO nanoparticles have a crystalline bunsenite morphology.

5. The carbon-supported NiO electrode of claim 1, wherein at least 70% of the NiO nanoparticles have a particle size of 10-40 nm.

6. The carbon-supported NiO electrode of claim 2, wherein in the method of making the NiO nanoparticles a molar ratio of the pamoic acid or the pamoic acid salt to the nickel salt is 5:10-8:10.

7. The carbon-supported NIO electrode of claim 2, wherein in the method of making the NiO nanoparticles the nickel salt is $Ni(NO_3)_2$ or $Ni(NO_3)_2 \cdot 6H_2O$.

8. The carbon-supported NiO electrode of claim 2, wherein in the method of making the NiO nanoparticles the pamoic acid salt is present, and the pamoic acid salt is disodium pamoate.

9. The carbon-supported NiO electrode of claim 1, wherein the NiO nanoparticles have an average particle size that is substantially smaller than an average particle size of NiO nanoparticles produced by an otherwise identical method having no pamoic acid and no pamoic acid salt.

10. The carbon-supported NiO electrode of claim 2, wherein in the method of making the NiO nanoparticles the nickel salt and the pamoic acid or the pamoic acid salt have a combined weight percentage of 0.8-2.5 wt % relative to a total weight of the dispersed mixture.

11. The carbon-supported NiO electrode of claim 1, wherein the NiO nanoparticles have an average particle size of 15-25 nm.

12. The carbon-supported NiO electrode of claim 1, wherein the NiO nanoparticles have an aspect ratio of 1.1:1-1.35:1.

13. The carbon-supported NiO electrode of claim 1, wherein the density of the NiO nanoparticles on the carbonized paper is 130-170 µg/cm$^2$.

14. The carbon-supported NiO electrode of claim 1, wherein the NiO nanoparticles are aggregated into clusters having diameters of 3-12 µm.

15. The carbon-supported NiO electrode of claim 1, wherein the clusters have a nearest neighbor distance of 1 µm-3 µm.

* * * * *